US012005696B2

(12) United States Patent
Carmichael

(10) Patent No.: US 12,005,696 B2
(45) Date of Patent: *Jun. 11, 2024

(54) LIGHTWEIGHT INTERCHANGEABLE MAGNETIC SLEEVE AND METHOD OF MANUFACTURE THEREOF

(71) Applicant: SANDON GLOBAL ENGRAVING TECHNOLOGY LIMITED, Runcorn (GB)

(72) Inventor: Gary Carmichael, Runcorn (GB)

(73) Assignee: Sandon Global Engraving Technology Limited, Runcorn (GB)

(*) Notice: Subject to any disclaimer, the term of this patent is extended or adjusted under 35 U.S.C. 154(b) by 0 days.

This patent is subject to a terminal disclaimer.

(21) Appl. No.: 18/134,655

(22) Filed: Apr. 14, 2023

(65) Prior Publication Data

US 2023/0249449 A1 Aug. 10, 2023

Related U.S. Application Data

(63) Continuation of application No. 17/771,575, filed as application No. PCT/EP2020/079209 on Oct. 16, 2020, now Pat. No. 11,752,758.

(30) Foreign Application Priority Data

Oct. 24, 2019 (GB) ..................................... 1915458

(51) Int. Cl.

*B41F 27/02* (2006.01)
*B41F 27/10* (2006.01)
*B41F 27/14* (2006.01)

(52) U.S. Cl.

CPC ............ *B41F 27/105* (2013.01); *B41F 27/02* (2013.01); *B41F 27/14* (2013.01); *B41P 2227/20* (2013.01)

(58) Field of Classification Search

CPC ........ B41F 27/02; B41F 27/105; B41F 27/10; B41F 27/14; B41P 2227/20

(Continued)

(56) References Cited

U.S. PATENT DOCUMENTS

| | | | |
|---|---|---|---|
| 4,920,630 A | 5/1990 | Leanna | |
| 5,904,095 A | 5/1999 | Nelson | |
| 2022/0410559 A1 | 12/2022 | Carmichael | |

FOREIGN PATENT DOCUMENTS

| | | | |
|---|---|---|---|
| DE | 102005045756 A1 * | 3/2007 | .............. B41F 27/02 |
| GB | 1261165 A | 1/1972 | |

(Continued)

OTHER PUBLICATIONS

International Searching Authority, European Patent Office, International Search Report and Written Opinion, PCT/EP2020/079209, dated Feb. 25, 2021.

(Continued)

*Primary Examiner* — Leslie J Evanisko
(74) *Attorney, Agent, or Firm* — John H. Choi & Associates

(57) ABSTRACT

A lightweight interchangeable magnetic sleeve and method of manufacture thereof are disclosed. The sleeve assembly comprises an annular tube in the exterior surface having recesses filled with comparatively rigid magnetic means which are firmly adhered therein. The sleeve assembly includes a tubular radially compressible liner component, relatively slightly shorter than the tube, and bonded inside and substantially axially centrally within the tube thus leaving interior cylindrical end regions of the tube exposed beyond the annular end surfaces of said liner. The remaining exposed interior cylindrical surfaces of the tube are rebated back from the liner exposing annular shoulders within the tube. The rebates are tapped so that correspondingly sized threaded end rings of a more structurally robust, rigid and (Continued)

resilient material than the tube material, can be fitted into the tube ends and tightened against the annular shoulders created by the rebating, placing the entire sleeve assembly under slight compression.

19 Claims, 6 Drawing Sheets

(58) Field of Classification Search
USPC .............................................. 101/389.1, 378
See application file for complete search history.

(56) References Cited

FOREIGN PATENT DOCUMENTS

| | | | |
|---|---|---|---|
| GB | 2544785 | A | 5/2017 |
| TW | 200911537 | A | 3/2009 |
| WO | 2014/039537 | A2 | 3/2014 |
| WO | 2015/010013 | A2 | 1/2015 |
| WO | 2017/089221 | A1 | 6/2017 |

OTHER PUBLICATIONS

International Preliminary Examining Authority, European Patent Office, International Preliminary Report on Patentability, PCT/EP2020/079209, dated Oct. 5, 2021.

* cited by examiner

LIGHTWEIGHT INTERCHANGEABLE MAGNETIC SLEEVE AND METHOD OF MANUFACTURE THEREOF

CROSS-REFERENCES TO RELATED APPLICATIONS

This is a continuation application of U.S. Application Ser. No. 17/771,575 filed on Apr. 5, 2022, which is a national stage application of International Application No. PCT/EP2020/079209 filed on Oct. 16, 2020, which claims priority to United Kingdom Application No. 1915458.2 filed on Oct. 24, 2019, all of which the present application claims priority and which are incorporated by reference in their entireties.

FIELD OF THE INVENTION

The present invention relates to a lightweight interchangeable sleeve and a method of manufacture thereof. In particular, the invention provides a sleeve having a generally continuous cylindrical exterior surface which is inherently or extrinsically magnetic, either in multiple specific discrete areas thereof or more pervasively, such that a typically flexible ferromagnetic plate having a mounting surface and an oppositely disposed functional surface, and being of appropriate shape and dimensions, may be firmly and substantially only magnetically secured around at least some portion of the exterior cylindrical surface of the sleeve with its mounting surface disposed most proximate, and preferably in contacting relationship with, the sleeve exterior surface. Typically the axial and circumferential positioning of the plate on and around the sleeve will be of critical importance, as the functional surface of the plate will, in use, typically come into contact with a substrate material on which some function is to be performed (e.g. printing, coating, lacquering, varnishing, and the like), so it is generally essential that the plate is precisely positioned on the exterior surface of the sleeve so that the plate is automatically precisely aligned and in registration with the substrate.

More specifically, the present invention relates to a the provision of a magnetic sleeve which is comparably very lightweight as compared to current cylindrical magnetic mounting components, and which is furthermore adapted to be very easily and quickly interchangeable, in that any sleeve according to the present invention can be easily and quickly installed (and removed from) within much larger machinery, for replacement or maintenance, by a single person, safely and without significant extraneous support or assistance, and in a manner which nevertheless ensures accurate and precise axial and radial mounting of both the sleeve and the plate magnetically affixed thereto.

Background to the Invention

Within the printing and other industries, the physical principle of magnetism is commonly employed as useful means of releasably securing ferromagnetic components to magnetized surfaces, particularly when such ferromagnetic components are likely to require frequent replacement, or there is a requirement for speedy interchange of such components, and where the magnetic force of attraction exerted on the component by the magnetized surface on which it is most commonly directly mounted will generally be sufficient to ensure a robust and reliable connection between the two.

There are many examples of modern industrial and commercial machinery within which components are magnetically secured to one another. For example, modern commercial and industrial print presses and other web- and sheet-fed machines commonly utilise magnetic cylinders and/or platens as a means of securing correspondingly dimensioned steel printing, coating or varnishing plates, or cutting dies, to the cylinder or platen. Heretofore, the magnetic cylinder has always been a very substantial, weighty component consisting essentially of a solid steel or aluminium cylinder with journaled ends to allow the cylinder to be mounted within the press. In order that the exterior surface of the cylinder be rendered magnetic to a sufficient degree (i.e. provided with sufficient radially projecting magnetic field strength over substantially its entire cylindrical exterior surface), a series of circumferentially evenly spaced, uniformly dimensioned slots may be milled therein, each slot extending essentially longitudinally over the cylindrical outer surface of the sleeve, from one end thereof to the other. The slots may be essentially straight and thus parallel with the longitudinal axis of the sleeve or they may extend arcuately in spiral fashion over the cylindrical exterior surface, but in any event, a plurality of individual metal magnets and intervening ferromagnetic keepers or pole pieces are alternately inserted into the slots in parallel fashion adjacent one another all along each and every slot, and adhered both to the side faces of the slot and to each other, for example with a high strength epoxy resin. Once all the slots are filled in this manner, the cylinder is then subjected to grinding and finishing in order that the exterior surface is perfectly cylindrical and generally smooth.

In order that the exterior cylindrical surface of the cylinder can magnetically attract a steel or other ferromagnetic material printing plate with sufficient force, the individual magnets inserted into each and every slot must themselves be inherently magnetic to a sufficient degree, and their magnetic fields must be both concentrated and directed such that their magnetic fields essentially project normally upwardly away from the exterior cylindrical surface. The most common arrangement therefore is that each and every magnet, in the form of a thin (<5 mm) rectangular shim, is inserted into the slot laterally followed by an intervening ferromagnetic keeper or pole piece of similar size, such that in any single slot, there may be as many as 30-100 or more individual magnets and respective pole pieces. The North (N) and South (S) poles of each magnet will typically coincide with their largest rectangular faces (orientated such that the plane of those faces lies orthogonally to the longitudinal axis of the cylinder), and their alignment and arrangement within the slots is such that the most adjacent poles of any two magnets on either side of an intervening pole piece are of the same polarity. Such arrangement ensures that each and every intervening pole piece is one of North (N) or South (S) polarity, and the magnetic field from the magnets on either side is thus both concentrated in and directed through the pole pieces towards the cylindrical surface.

The types of magnets most commonly employed in prior art magnetic cylinders are ferrite ceramic magnets, for example being either fundamentally Strontium- or Barium-based, because such ferrite compositions have good resistance to corrosion and demagnetisation, and can be readily ground, finished and (in some cases) polished, much like the solid metal or alloy cylinder in which they are disposed.

Although magnetic cylinders of the type described above are in widespread use in printing and other heavy engineering machinery, their primary and pervasive disadvantage is their weight. As the skilled reader will appreciate, solid magnetic cylinder components are very heavy (often >>30 kg) and therefore very unwieldy—in most cases, magnetic cylinders cannot be manipulated and handled by one, or even two persons. In some cases, if the cylinder itself is damaged, fails or requires servicing, then its removal from within the machine in which it operates is a non-trivial and substantial procedure. A yet further disadvantage is that solid magnetic cylinders of the type described are largely prohibitively costly, and very labour-intensive and thus time-consuming to manufacture, and their use is therefore limited to only such applications where there the speed and simplicity as regards detaching, removing and replacing a printing plate or die are of paramount importance and outweigh the underlying cost of the magnetic cylinder which provides such facilities.

In order to mitigate the above disadvantages, tubular constructions have been proposed wherein a steel, aluminium or other metal or alloy tubular base component is provided, being essentially annular in cross-section, and through which thus extends a cylindrical hollow bore. Slots to receive the magnets and respective pole pieces must of course still be provided in the exterior cylindrical surface as described above, but naturally a tubular component will always weigh significantly less than a corresponding solid component. However, despite this overall weight reduction, the ease with which such tubular components can be reliably, securely and (most importantly) accurately mounted in print and other machinery is more complicated than for a fixed-in-place solid component.

To explain further, in the case of a solid cylinder with accurately machined and located journals at either end, the position and orientation of the solid cylinder is automatically ensured when the journals are disposed in appropriate oppositely disposed fixed bearings within the machine in which the cylinder is to operate. With a tubular component however, the mounting procedure is more complicated because firstly, the tubular component must firstly be slid over an arbor or mandrel of some kind, and secondly, and thereafter as a separate step, the tubular component must then be mechanically secured to that arbor or mandrel in a manner which ensures not only a robust connection of the tubular component to the arbor or mandrel, but which also ensures that the exterior surface of the cylinder is in precisely parallel alignment with the axis of the arbor or mandrel on which it is mounted to avoid rotation eccentricities. As can be seen in prior art documents WO2014/039534 and WO2015/010013 (both in the name of Bunting Magnetics Company, and which cover their PlateMaster™ magnetic sleeve), mechanically intricate connection components are commonly required to achieve a reliable, robust and accurate mounting of a tubular magnetic component. Furthermore, in the PlateMaster™ system, in order to achieve precise axial and circumferential positioning of the sleeve relative to a spindle on and over which the mandrel is mounted, one end of this particular sleeve is provided with largely integrated a solid hub component having adjustment screws therein, further complicating the design. One final important disadvantage of the PlateMaster™ system is that although the sleeve alone may be relatively significantly lighter than a corresponding solid cylinder component, the annular thickness of the sleeve is not only still quite substantial, e.g. at least 30 mm thick at one end and >40 mm thick at the alternate (the reasons for which will become apparent from the further description below), but once the adjustment hub is inserted into one end, which is a solid component, the overall weight of the assembly can still be significant.

In certain types of flexographic and gravure printing machinery, and in machinery developed specifically for what is known as "metal decoration", being essentially the printing, coating, lacquering and varnishing of beverage and food cans (see for example machinery available from Stolle Machinery Company, LLC., in particular the Concord™ Metal Decorator and Rutherford™ Decorator and Basecoater), the adoption and use of magnetic cylinders and/or magnetic tubular components is becoming more common.

It has also been proposed to replace other non-magnetic solid cylindrical components such as printing and impression cylinders, Anilox rolls, metering rolls, and the like, with corresponding tubular components, albeit still primarily comprised of structurally robust metals such as steel and Aluminium. For instance, the replacement of printing and Anilox cylinders with low cost, lightweight print and Anilox sleeves, still primarily constituted of metal, has been proposed, such sleeves being releasably mounted within more conventional print (i.e. not metal decoration) machinery around what are known as bridge mandrels. Bridge mandrels are essentially cylindrical adapters which on one hand are essentially permanently and axially and circumferentially precisely mounted on a rotating arbor within the machine, and which on the other hand provide an exterior and precisely orientated cylindrical surface to and around which the print or Anilox sleeve can be releasably attached. To release (and to install) the sleeve, the bridge mandrel is connected to a supply of compressed air which is typically delivered through the mandrel to its exterior surface to cause a compressible inner layer of the removable Anilox sleeve to expand, thus releasing the connection therebetween and enabling the sleeve to be axially slid over and eventually completely off (during removal) the bridge mandrel. In terms of relevant prior art, U.S. Pat. No. 5,904,095 discloses the fundamental aspects of bridge mandrels in general, and the Applicant's own application WO2017/089221 describes an Anilox sleeve essentially consisting of a steel or aluminium tube for use in machinery with a bridge mandrel. Of course, similar arrangements may be utilised for components other than Aniloxes, for example print and impression rolls.

Up until the present time, all sleeve constructions, and certainly those described above and intended for use in print and other engineering machinery, consist primarily and fundamentally of metal, most commonly Aluminium or steel, due to the fact that such rotating components must, in order to properly and effectively perform their intended operative function, exert some non-negligible (and often considerable) force on some other component.

In the particular case of magnetic sleeves, and importantly in the context of the present invention, significant amounts of material are required to be machined out from the initially annular sleeve, for example by milling or drilling, to create the plurality of magnet-receiving slots which will most commonly be provided in, and indeed all around the cylindrical exterior surface of the sleeve, and therefore the annular thickness of the initially annular sleeve becomes very important, as will be explained further below.

To provide some specifics on how existing magnetic sleeves are currently machined out, a conventional magnetic sleeve adapted for use on existing metal decorating machinery may have an axial length of apprx. 200 mm and have internal and external diameters of apprx. 190 mm and 230 mm (and thus an annular thickness of 20 mm) respectively. Naturally, the annular thickness of the initial tubular billet must be greater (in prior art constructions, at least 2 times) than the depth of the magnet-receiving slots which are to be machined into and around its exterior cylindrical surface—usually, the depth of the slots will be of the order of 10-19 mm, this dimension of course depending on the depth of the magnets and accompanying keepers which the slot is to receive. Furthermore, as it is very important that the ferromagnetic plate which is to be magnetically secured around the exterior surface of the sleeve is firmly held in place, especially in the region of its lateral edges, the axial length of the slots (and ultimately the arrangement of magnets and keepers within them) generally extend almost completely from one axial end of the sleeve to the other, and may be, for example, 185-195 mm long, or even possibly more, thus leaving only very small, axially thin lands of sleeve material between the end of each machined slot and the end of the sleeve itself, e.g. maybe only 2.5-5.5 mm, or even less. Finally, in terms of the number of slots to be machined in the exterior cylindrical surface and their resulting width, this is again significant, because in order that the resulting exterior cylindrical surface of the sleeve is provided with sufficient magnetic field strength to firmly secure the ferromagnetic plate thereto, current thinking is that at least 40%, and possibly as much as 60-80% of the sleeve exterior cylindrical surface must be magnetic, i.e. be constituted of magnet- and keeper-containing slots, as opposed to the relatively non-magnetic lands of sleeve material defined between any pair of circumferentially adjacent slots. Therefore, depending on the overall outer diameter of the sleeve, as many as 12-24 separate slots, most commonly aligned with the central axis of the sleeve and having a width (measured circumferentially) of apprx. 15-35 mm may be machined into and over the sleeve exterior cylindrical surface.

As the skilled person will understand, the material from which the sleeve is manufactured must possess significant inherent rigidity, structural strength and machinability such that a sleeve can not only be machined out in the manner described without significantly elastic or plastic deformation, cracking, tearing, or other permanent structural weakening, but also the sleeve must possesses sufficient residual structural strength and rigidity once the machining is completed such that the machined-out sleeve is still capable of withstanding the considerable forces to which it will be subjected in operation. It is for these fundamental reasons that the thickness of the initially annular sleeve must still be significant because, naturally, the structural integrity and dimensional stability of the initially solid annular sleeve component will inevitably be weakened as each and every slot is progressively machined out in the manner described. As the skilled reader will appreciate, the structural and dimensional stability of such components is ultimately often an essential factor in their ultimate performance, it is essential that the machined-out sleeve construction be similarly robust.

A further consideration in the manufacture of magnetic sleeves is that magnets and keepers, in repeating alternate fashion, are inserted into and generally adhered within the machined-out slots provided in the exterior surface of the sleeve. As also mentioned, the outer diameter of the sleeve is generally a critical dimension in the specification and operation of any sleeve, because it is the outer diameter which determines (after a ferromagnetic plate of known thickness is secured on and around the exterior cylindrical surface of the sleeve) the distance of the operative or functional surface of the plate from the axis of rotation of the sleeve, and in turn the relative weight or pressure which that functional surface may exert on the substrate being printed, coated or otherwise acted upon. Therefore, in order that the outer diameter of the sleeve can be accurately defined, it is generally mandatory that the exterior cylindrical surface of the sleeve be ground, finished and/or polished down to a precise outer diameter dimension, after the magnets and their intervening keepers have been adhered in place within the slots. Therefore, typically a sleeve will be initially provided with an outer diameter slightly larger than that ultimately required so that the exterior cylindrical outer surface can be appropriately and accurately surface ground down (and often also polished) to the required ultimate outer diameter. Currently, the keepers employed in conventional sleeves are usually of steel, and the magnets are usually of a ferrite material which can also be relatively easily ground (and polished) by the same equipment, thus rendering the grinding (and polishing) relatively straightforward. This would not be the case if the sleeve were constructed of a material or composition whose structural and physical properties were significantly different from those of the magnets and their keepers, or if the nature of the material of which the sleeve was primarily constructed did not lend itself to grinding or polishing (for example synthetic fibrous, or fibre-reinforced, materials and compositions).

Although a steel sleeve can adequately fulfil most requirements (provided initially annular sleeves are sufficiently thick), their fundamental disadvantage is still their weight, as steel is relatively dense. For example, a sleeve having the abovementioned dimensions will have a total material volume of apprx. $2.6\times10^{-3}$ $m^3$. If manufactured in steel, this sleeve would have an approximate weight of over 20 kg, whereas if made in Aluminium the weight would drastically reduce to a much more manageable 7 kg (excluding any machining, the effect of which is considered to be negligible here because the machined slots are completely filled with magnets and keepers having considerable weight themselves). Although it would of course be possible for a single individual to lift of a steel sleeve of 20 kg, manually manipulating and manoeuvering components of this weight at any significant height above ground level, as is often required, can still be problematical, especially for a single person.

In terms of other candidate materials, as the skilled person will appreciate, there are already in existence a wide array of engineering plastics and plastics composite materials of even lower densities than Aluminium and therefore could offer yet further weight reductions if sleeves were manufactured entirely or substantially in such materials. However, almost universally, the most suitable engineering plastics (at least without the benefit of fibre reinforcement of any kind) lack the required physical, structural and mechanical properties, typified most conventionally by the Young's modulus (often termed the modulus of elasticity or ultimate tensile strength), and also the bulk modulus (the measurement of how resistant a material is to compression). For example, the Young's modulus and bulk modulus of Steel are in the region of 200 GPa ($N/m^2$) and 160 GPa respectively, whereas for a common engineering plastic known as Nylon® 66 (having a density of 1140 $kg/m^3$), these values are 3.5 GPa and 2.9 GPa respectively, notably greater than one order of magnitude less. Thus, although while a sleeve made from an engineering plastics material may offer a significant reduction in weight as compared to a sleeve made of Steel (e.g. a sleeve having the specific dimensions abovementioned and made from Nylon® 66 could weigh as little as 3 kg), unfortunately the physical, structural and mechanical properties of such plastics cannot, on their own at least, be adequately or successfully machined, or indeed withstand the rigours of operative use.

Indeed, although the Young's modulus and bulk modulus of Aluminium are of the order of 20 times greater than those of Nylon 66 above (at 70 GPa and 76 GPa respectively), machining pure Aluminium sleeves, particularly those with relatively thin annular walls as is the case for sleeves of the present invention, is still particularly difficult to conduct, not least because Aluminium is particularly ductile and its tendency to deform during machining is still very much greater than that of steel.

It is therefore a primary object of the present invention to provide an interchangeable sleeve construction within which magnet-receiving slots, channels, recesses or other voids can be machined or otherwise provided and subsequently filled with magnetized components or compositions, and which is of significantly reduced weight as compared to sleeves of the prior art.

It is a yet further object of the present invention to provide such a sleeve which can withstand the rigours of both machining (if required) and conventional operative use, despite the existence of the plurality of magnet or magnetic composition-filled voids that inevitably and necessarily reduce the overall structural integrity of the sleeve.

It is therefore a further object of the invention to provide a new type of sleeve construction which incorporates an initial annular sleeve component made either of an engineering plastics material or a lightweight metal such as Aluminium, and having a comparatively much reduced annular thickness as compared to prior art sleeve, but which can nevertheless still be both successfully and reliably machined without being structurally compromised, and which in use, can successfully and reliably withstand the loads to which the sleeve construction will be commonly subjected during use.

It is a further object of the invention to provide a sleeve construction, which is of significantly reduced cost as compared to the corresponding components primarily constituted only of metal or an alloy thereof, both in terms of the materials used in the manufacture of the said component, and also in terms of the costs of labour and time involved in manufacturing such a sleeve construction.

It is a further object of the invention to provide a method of manufacturing industrial, commercial and engineering magnetic sleeve constructions comprising or consisting essentially of an annular sleeve made from an engineering plastic or plastic composite material, or a relatively (to steel) lightweight metal or alloy thereof, not being generally magnetic and having an attachment surface which is rendered magnetic in an essentially separate machining step after the annular sleeve is initially formed, said attachment surface thus facilitating the substantially purely magnetic attachment of some other functional component.

SUMMARY OF THE INVENTION

According to the present invention there is provided a sleeve assembly according to the claims hereof.

For the avoidance of doubt, the phrase "substantial proportion" as appearing in the claims hereof should be understood to mean at least 50%, and preferably at least 60%, more preferably at least 70-75%, yet further preferably at least 75-85%, and even further preferably at least 90%-95%. For example, for a cylindrical tube having initial outer and inner diameters of 227 mm and 210 mm respectively, and thus an annular thickness of 8.5 mm, slots may be 6 mm deep and 20 mm wide, leaving only 2 mm of sleeve material remaining between the base of the slot and the interior cylindrical surface of the tube, and leaving only (approximately) 193 mm of the total circumferential dimension of 713 mm the of the exterior surface not recessed.

Preferably, the relative moduli of elasticities of the end rings and the material of which the tube is constituted should be at least a factor of 2 greater, and further preferably at least a factor of 3-5 greater, and most preferably at least one order of magnitude (i.e. a factor of 10) greater.

Preferably, the end rings are constituted substantially entirely of a metal, most preferably steel, or any similarly structurally capable metal or alloy thereof.

In the most preferred embodiment, the tube is constituted entirely of Aluminium, but in embodiments where the tube is constituted of an engineering plastics material, this is preferably a synthetic polymer, which is most preferably non-fibrous and/or not reinforced with fibres or otherwise. In most preferred arrangements, the synthetic polymer is one of, or some combination of: an acetal-based homopolymer or copolymer (such as Delrin®, available from the DuPont® company), a polyamide (such as Nylon 6 or Nylon 6, 6), and a polyester.

To provide some specifics on the mechanical strength of such plastics materials, most "Delrin®", Nylon 6 or 6,6 polymers have a modulus of elasticity of the order of 3 GPa at 23 deg. C (room temperature), whereas the corresponding measure for mild steel is of the order of 200-210 GPa, and for Aluminium is 70 GPa.

Preferably the liner is of multi-laminar construction, and comprises a first, radially innermost fabric base wrap layer, a second compressible layer disposed radially to the outside of the first layer and being of a closed- or open-celled foam material, and a third bulking or build-up layer, disposed radially to the outside of the second layer, and being again fibrous in nature, and preferably being thoroughly impregnated with a resinous composition which, once cured, provides the liner with rigidity. Further preferably the third layer is constituted substantially of resin-impregnated coir mat. Most preferably, the liner further includes at least one intervening barrier layer disposed between the second and third layers, said intervening layer most preferably being constituted most simply of common masking tape wrapped around the exterior cylindrical surface of the second compressible layer to prevent any pre-cured resin present in the third layer from migrating into the compressible layer during construction.

Most preferably the exterior cylindrical surface of the liner is securely and firmly bonded to the interior cylindrical surface of the tube by means of a high strength epoxy-based adhesive which, once cured, provides an effective and rigid bridge between the adjacently disposed cylindrical surfaces of liner and tube respectively, over substantially the entirety of those surfaces.

Most preferably, once screwed in position, possibly after having been surface ground or otherwise machined, the axially outermost annular end surfaces of the end rings lie substantially flush with the annular end surfaces of the tube.

In some embodiments of the invention, preferably at least one (and most preferably both) of the annular shoulders are provided internally of the tube at a sufficient axial depth from the respective annular end surfaces thereof such that said at least one, and preferably both, of said annular shoulders is disposed radially beneath at least one (and preferably all) of the recesses provided in and generally axially along the exterior cylindrical surface of the tube. In this configuration, the annular shoulder(s) provided internally of the tube essentially undercut the recesses provided around the exterior surface of the said tube to some extent. In this configuration, it is thus of course essential that the depth of any (or all) of the recesses which are so undercut must be less than the annular thickness of the rebated end regions of the tube, and in most preferred embodiments, the depth of the recesses will be between 1-10 mm less than the annular thickness of the annular end surfaces of the tube, which will be preferably between 5-20 mm.

It is also to be noted that in this configuration, the ends of the recesses will necessarily axially overlie the screwed-in-place end rings to some extent, and the end rings, being significantly more structurally strong and rigid than the material of which the tube is constituted, thus importantly contribute to the structural strength, at least in a circumferential sense, of the partially machined out end regions of the tube.

In an alternate embodiment, preferably at least one (and most preferably both) of the annular shoulders are provided internally of the tube at a relatively shallower axial depth from the respective annular end surfaces thereof than that between at least one (and preferably all) the terminal ends of the recesses and the annular end surfaces of the tube most proximate thereto. In this configuration, in contrast to that described above, it is of course not strictly mechanically unavoidable that the annular end surfaces of the tube must be of an annular thickness dimension which is greater than the depth of the recesses (measured radially), but as the annular shoulders preferably have a comparatively small radial thickness, at least relative to that of the annular end surfaces of the tube, it is still also preferred that the annular thickness of the tube is greater than the depth of the recesses, most preferably between 5%-100% greater. Of course, as the thickness of the annular end surfaces (and thus of the tube in general) increases, the overall weight of the sleeve assembly increases markedly, and as it is an aim of the present invention to keep the sleeve assembly weight as low as possible, the most preferred arrangement is that the annular thickness of the tube annular end surfaces (and in turn the tube generally) is between 10-50% greater than the depth of the any one, or all, of the said recesses. In most preferred embodiments, the depth of the deepest or all of the recesses is of the order of 4-15 mm, and the corresponding tube thickness is thus of the order of between (4.1 mm-16.5 mm)-(6 mm-22.5 mm).

The issue of recess depth as compared to the general annular thickness of the tube in which the recesses are provided is an important one because, as the skilled person will appreciate, the machining out of a significant number of deep recesses in an already relatively thin-walled tube is obviously a mechanically unsound practice, not least because the removal of significant amounts of the material from the tube in this manner can seriously compromise the structural rigidity and stability of the remaining article, which may be rendered somewhat flimsy as a result. Furthermore, as previously described, the flimsier a structure becomes, the more difficult it becomes to perform further machining on, in and around that structure. Again, in extreme cases, the structure may become so flimsy that it is ultimately cracked, ripped, torn apart or otherwise irreparably damaged as soon as the machining tool commences any work on the flimsy tube structure having already been weakened by earlier machining.

The present invention overcomes such problems by internally reinforcing the tube by firstly providing screwed-in-place metallic (most preferably steel) end rings which are significantly mechanically and stronger and elastically much more resilient than the tube into which they are screwed. Secondly, although the interior liner construction is inherently radially compressible, such compressibility is provided by an intermediate compressible layer provided as part of the multi-layer construction of the liner, and such compression is achieved predominantly against the outermost bulk-up or build-up layer of the liner throughout which a cured, and thus rigid, resin is impregnated. Thus in its own right, the liner is self-supporting and, externally at least, a relatively rigid structure, even before it is adheringly affixed within the tube as described above. What is less obvious is that by selecting a suitable epoxy- or similar type adhesive to bond the liner to and within the tube, and ensuring that an adhesive layer substantially completely fills the tiny annular interstice which may exist between the exterior cylindrical surface of the liner and the interior cylindrical surface of the tube, and then allowing that adhesive to cure into a rigid layer which binds the liner to the tube, the resulting sleeve assembly is immediately strengthened, both circumferentially and axially, and over the axial length of the tube within which the liner is bonded. Mechanically, this is because the rigid interior liner structure essentially becomes part of tube, and the response thereof to machine tools working on the exterior cylindrical surface thereof, at least in those regions beneath which the liner is disposed, is much more like a tube having a much greater annular thickness.

A yet further structural enhancement, particularly as regards the rigours of machining and general use, is the axial compression to which that portion of the tube between the end rings is subjected as a result of the end rings being screwed firmly (but not excessively so), for example by using a torque wrench or similar, within the rebates defined at either end of the sleeve assembly and up against the annular shoulders rebated out from the end regions of the tube as aforementioned. This compressive force yet further enhances the resistance of the tube, particularly to axial forces it will inevitably experience when the machine tool moves axially along the exterior cylindrical surface of the tube, as it will inevitably repeatedly do as the (usually, preferably) elongate recesses are machined out of that surface. Thus, in conjunction with the interior liner, the end rings and their structurally enhancing and rigidifying effects effectively render what would otherwise be an inherently flimsy and unmachinable tubular article into a machinable one.

Furthermore, the end rings also provide significant circumferential (and axial, though over a relatively short axial distance) structural support and resilience specifically for the end regions of the tube, where such support and resistance is arguably most required. This is because the nature of sleeve assemblies according to the present invention is that recesses must be machined out over substantially the entire axial length of the tube, so the machining tool will inevitably approach the annular end surfaces of the tube, where the axial resistance of the tube is inevitably significantly reduced as compared to that offered by the material of the tube when the machine tool is working much closer to the axial mid-point of the tube. Thus, by providing a sleeve assembly having the construction described, it is possible to reliably machine both very close to the annular end surfaces of the tube, and in some cases (if it is desired to provided partially or completely open-ended recesses) completely through said annular end surfaces without significantly compromising the overall structural integrity of the overall sleeve assembly construction.

In the most preferred arrangement, wherein the annular shoulders provided within the tube undercut the recesses disposed radially above, the machine tool necessarily axially traverses into the end regions of the tube within which the end rings are provided, and therefore the end rings provide additional radial support to allow the machining to continue without the end region being damaged. Even in embodiments of the invention where the recesses are not undercut to any extent by the annular shoulders and the end rings abutting them, but the ends of the recesses are disposed substantially axially coincident with, or lie axially proximate (for example, within 1-5 mm), the annular shoulders, during machining out of the recesses, particularly towards their ends, the structural support provided by said end rings is nevertheless still important because their existence will automatically provide resistance to the bending moment which the machine tool will naturally apply to the tube as it approaches the end of the current recess being machined out.

A yet further advantage of the sleeve construction described arises when the sleeve assembly is in operative use, and is being subjected to significant radial compression forces all along its axial length. Specifically, in use, both the liner and end rings provide the additional structural internal support for the liner to enable it resist such forces without significantly deforming, whether elastically or plastically, and without sustaining any other type of more significant damage. The resulting sleeve construction is therefore highly dimensionally stable, which is very important for sleeve constructions adapted to receive printing or coating plates which, in use, contact a substrate, both in precise registration and with a precise, predetermined contact pressure, in order to achieve optimum printing or coating performance.

In view of the above, the relative axial locations of the ends of the recesses as compared to the axial depths at which the annular shoulders are provided internally of the tube should be considered as an important aspect of the present invention. Indeed, in a most preferred embodiment, at least one, some or all of the ends of the recesses are undercut to some extent, and the terminal ends of at least one, some or all of said recesses are provided at an axial depth from the annular end surfaces of the tube which is less, by a non-negligible amount (e.g. at least 1 mm, preferably 2-15 mm) than that at which the annular shoulders are provided. Alternatively, any or some combination of the various possible arrangements below may, in some embodiments, be considered, namely:

- where one, some or all of the ends of the recesses are not undercut by the annular shoulders to any extent, but the terminal ends of any one, some or all of the recesses are provided at an axial depth from the annular end surfaces of the tube which is at most 5 mm further than that at which the annular shoulders are provided,
- where the terminal end of any one some or all of the recesses are provided at an axial depth from the annular end surfaces of the tube which is substantially the same as that at which the annular shoulders are provided, and
- where one, some or all of the ends of the recesses are undercut to some extent, and the terminal ends of any one, some or all of the recesses are provided at an axial depth from the annular end surfaces of the tube which is less, by a non-negligible amount (e.g. at least 1 mm, preferably 2-15 mm) than that at which the annular shoulders are provided.

Most preferably, the recesses provided in the exterior cylindrical surface of the tube are axially aligned with the longitudinal axis of the sleeve assembly as a whole, and further preferably, each recess contains an alternating arrangement of magnet-keeper pairs which substantially fill each recess and are adhered or otherwise firmly and immovably secured within said recesses, the uppermost surfaces of all said magnet-keeper pairs lying substantially flush with the plastics material lands defined between each adjacent pair of recesses and thus disposed circumferentially to one or other side thereof. In an alternative embodiment, the said recesses may be provided in spiral arrangement over the exterior cylindrical surface of the tube.

In preferred arrangements, the axial depth dimension of one or both end rings is of the order of 8-25 mm, most preferably of the order of 10-15 mm, with between 50-90% of this dimension being threaded. Preferably, the pitch of the threads is between a Unified Coarse Thread (UNC) measurement of #12-24 and #1-64 (i.e. between 1.058 mm-0.397 mm). Where the tube is constituted of an engineering plastics material, the thread pitch is selected to be at the larger end these two extremes on account of the difficulty in successfully machining very finely pitched (e.g. <1 mm pitch) threads in plastics materials. Furthermore, the provision of threads of relatively large pitch in both the exterior cylindrical surfaces of the metal end rings and the corresponding inner cylindrical surfaces of the rebates provided in the tube allows not only for easy and immediate thread location and interengagement, but also for the end rings to be screwed into the said rebates with sufficient force (without rupturing, stripping or otherwise damaging the threads in the plastics material) such that the mid-section of the tube between respective end rings can be sufficiently axially compressed to enhance the overall structural rigidity of the sleeve assembly as a whole.

Most preferably, prior to screwing engagement of the end rings within the tube, an epoxy or similarly capable curable adhesive is applied to one or both of the threaded portions of end ring and the rebates.

Preferably, the adhesive is initially fluent but sufficiently viscous, for example having a viscosity similar to that of engine grease, so that it can be smeared into, over and around substantially the entire threaded region(s) of one or both respective parts of the sleeve assembly, and be retained therein and thereby without flowing or dripping under gravity. Thus after the adhesive is applied, the end rings can then be screwed into each end of the tube, and the mechanical advantage achieved as a result of circumferential motion of the end ring as compared to the thread pitch allows the end rings to be not only very firmly screwed into the tube, but also in a manner which allows for the application of at least some axially compressive force to be applied between the said end rings when the second of them is screwed into position. As the end rings are screwed in, of course, the adhesive will be forced into and around substantially all the threads, such that significant portions thereof will be well coated with the adhesive. Once the end rings have been screwed into place with the desired, preferably predetermined, torque, the adhesive is then allowed to cure effectively securely bonding the end rings in place within the tube.

In further preferred embodiments, one or both of the annular end surfaces of the liner and adjacent annular shoulders, and the corresponding annular end surfaces of the end rings which will, once fitted, be disposed substantially adjacent the liner annular end surfaces have applied thereto an initially fluent viscous gasket composition which once cured, creates a seal in the axially small annular gap which may (in some embodiments) exist between the end ring annular end surface and the corresponding annular end surface of the liner. This cured-in-place gasket compound also has the additional desired effect of sealing the annular end surfaces of the liner, thus preventing fluid ingress thereinto when the sleeve assembly is in use. In some embodiments, the adhesive may be applied to these surfaces and perform the function of a viscous but ultimately curable gasket composition.

Effectively robustly securing the end ring within the tube in the manner described is important because at least one of the end rings will commonly, and preferably, be provided with at least one, and preferably two registration notches which will receive or engage with one or two correspondingly shaped pins provided on the mandrel onto and over which the sleeve assembly is to be fitted, thus ensuring that the sleeve assembly is circumferentially extremely accurately located relative to the mandrel. In preferred embodiments, where two registration notches are provided, one notch is larger than the other, and the correspondingly shaped pins provided on the mandrel are likewise comparatively sized. In a yet further preferred embodiment, the exposed annular end surface of one end ring is provided with a radially extending mark, indentation, or other easily visible indicator whereby an operator can immediately identify one end of the tube from the other, and whereby said operator can readily angularly correctly orientate said tube relative to a similar or corresponding indicator provided on the mandrel on and over which said tube is to be mounted by rotating the tube into a position whereby the respective indicators provided on mandrel and tube are in general alignment.

Further preferably, the exterior cylindrical surface of the tube is provided which at least a pair, in some cases two pairs of plate positioning formations, one preferably being circular and the other preferably being oval-shaped, each of said pair of formations being preferably provided within one of the lands of plastics material between a pair of adjacent recesses, and both of said formations being precise axially aligned with the longitudinal axis of the sleeve assembly as a whole, as well as being extremely accurately circumferentially located with respect to the registration formation provided in the end ring. As the skilled person will appreciate, the provision of these registration features, and the accuracy of their positioning, are important because they automatically ensure that a printing or coating plate, having apertures corresponding in shape and relative separation to the plate-positioning formations provided on the exterior cylindrical surface of the sleeve, can be accurately and manually positioned on the exterior cylindrical surface of the sleeve assembly, for example initially along one lateral edge thereof before being subsequently wrapped around the sleeve assembly exterior surface and being progressively increasingly magnetically secured thereto as it is so wrapped. Most preferably, the exterior cylindrical surface of the tube is provided with a scribe line which extends circumferentially substantially completely around the exterior cylindrical surface of the tube, said scribe line coinciding with the centroid of the cross-sectional shape of one or other, or (where two scribe lines are provided) both of the plate-locating formations (or both pairs thereof) provided on the exterior cylindrical surface of the tube.

As regards the construction of the liner, preferably, the base wrap radially innermost layer is formed from a fibrous material impregnated with a curable composition such as an epoxy- or other resin-based adhesive. Most preferably, the base layer is a resin-impregnated fibreglass layer which is cured to form a generally rigid structure which is nevertheless elastically expansible under radially applied compressive force. The compressible layer of the liner is preferably one of: a foam, a sponge, cellular construction. Further preferably, the compressible layer is made from one of: a naturally occurring and a chemically synthesised material. Preferably, the compressible layer consists essentially of one or more of the following common polymeric foams: Ethylene-vinyl acetate (EVA) or polyethylene-vinyl acetate (PEVA) foam, Low-density polyethylene (LDPE) foam, Nitrile rubber (NBR) foam (being any copolymers of acrylonitrile (ACN) and butadiene), Polychloroprene foam or Neoprene, Polyimide foam, Polypropylene (PP) foam, including expanded polypropylene (EPP) and polypropylene paper (PPP), Polystyrene (PS) foam, including expanded polystyrene (EPS), extruded polystyrene foam (XPS) and polystyrene paper (PSP), Styrofoam, including extruded polystyrene foam (XPS) and expanded polystyrene (EPS), Polyurethane (PU) foam, LRPu low-resilience polyurethane, Polyethylene foam, Polyvinyl chloride (PVC) foam. As previously mentioned, the radially outermost bulking layer may also be formed from a resin- or other adhesive-impregnated fibrous material such as coir mat soaked with an epoxy resin which is cured therein.

In further aspects of the present invention, there are provided methods of manufacturing a sleeve assembly as described above, and a sleeve assembly resulting from the performance of that method.

In particular, in as second aspect of the present invention there is provided a method of manufacturing a sleeve assembly, the method comprising the following fundamental steps:

Starting with cylindrical tube having outer and inner diameter (OD, ID) dimensions respectively greater than and less than the ultimately required OD/ID dimensions of the finished sleeve assembly,

- counterboring the tube to a precise ID dimension,
- adhesively bonding a tubular compressible liner having an OD of the order of 0.3-1.5 mm less than the ID of the tube, and being of comparable length, within said tube to create a combined sleeve construction,
- cutting at least one length from the combined sleeve construction, said length being of the order of 0.5-4 mm longer than the ultimately required axial length of the sleeve assembly,
- machining out rebates at either end of the sleeve construction, said rebates having an axial depth of at least 20-60 mm back from the annular end surfaces of the tube, said machining comprising complete removal of liner over said axial depth as well as some amount of the tube interior, said amount being between 4-20% of the annular thickness of the tube such that annular shoulders, lying substantially flush with adjacent annular end surfaces of the liner, are defined within the sleeve construction at both ends thereof,
- machining threads on exposed internal cylindrical surfaces of said rebates;
- applying one or more of: a curable gasket compound over annular surfaces of said rebates shoulder, and a specific metal/plastics adhesive, such as an epoxy- or other resin-based adhesive, over one or both sets of machined threads provided within said rebates or on the corresponding external threads of one or both of a pair of metal end rings adapted to be screwed into said rebates,
- screwing said end rings into each sleeve assembly end and tightening said end rings against the said annular shoulders such that the tube is axially compressed between said end rings to a predetermined degree, said end rings being of an axial depth which is marginally greater than the axial depth of the rebates,
- milling a plurality of magnet-receiving recesses in the exterior cylindrical surface of the sleeve construction, said recesses being of a depth which is less than the annular thickness of the annular end surfaces of the tube and extending substantially axially from one end of the sleeve construction to the other, and furthermore being generally evenly spaced circumferentially around said exterior surface, such that the remaining surface area of the tube is less than 50% of the original cylindrical exterior surface area, adhering within each and every one of said recesses one or more a plurality of magnets or magnet assemblies such that they substantially completely fill said recesses with their uppermost surfaces substantially flush with the surrounding surface portions of the tube within which said recesses are provided, machining, for example by grinding and optionally polishing, the exterior cylindrical surface of the sleeve construction, with magnets or magnetic assemblies cured in place therein, such that the OD of the sleeve construction is precisely determined relative to a datum axis of machining, and machining the annular end surfaces of the sleeve construction at both ends, including said end rings, such that any portions of said end rings which stand axially proud of the adjacent annular end surfaces of the tube are removed, and such that the sleeve construction is machined down to a precise, predetermined axial length.

The method may include the further steps of milling out at least one circumferential registration notch in an annular end surface of at least one end ring, the circumferential width and axial depth dimensions of said registration notch being pre-determined such that said notch can receive a correspondingly shaped and dimensioned registration formation provided on a mandrel assembly on which said sleeve construction is to be mounted, and, in an immediately consecutive machining step, which is carried out on the same machining apparatus and without detaching and re-connecting the sleeve construction therefrom, machining out at least one pair of recesses adapted to receive a pair of accurately machined plate-locating formations, said recesses being arranged in axially perfect alignment with the central axis of the sleeve construction and at a precise angular position relative to the angular position of the registration notch, and inserting said pair of plate-locating formations into said recesses, and accurately positioning and securing said formations therein.

In a preferred embodiment, the method includes the further step of machining out a second pair of recesses in the exterior cylindrical surface of sleeve construction, said second pair of recesses also adapted to receive plate-locating formations and being firstly disposed in perfect axial alignment with the central axis of the sleeve construction and in precisely diametrically opposed relationship to the first pair of similar recesses. Most preferably, the machining out of said recesses is conducted to a depth which is less than, and preferably of the order of only 10-50% of the annular thickness of the tube so that the liner provided within the interior of the sleeve construction is not impacted or affected by said machining in any way. Most preferably, the size of the said recesses, and the machining of one or both of said pairs thereof is performed completely within a first, and optionally (if two pairs of recesses are provided) a second diametrically opposed land of tube material disposed between a respective adjacent pair of magnet-receiving recesses having been previously machined out from the exterior cylindrical surfaces of the tube. Provided that the plate-location formation receiving recesses are of a circumferentially smaller dimension than the particular land of tube material in which they are machined, and the angular position of the machining is approximately at the circumferential mid-point of that particular land of material, then of course neither of the most proximate side walls the respectively adjacent magnet-receiving recesses disposed circumferentially on either side of that particular land will be impinged upon, and thus neither the magnets or magnet assemblies disposed therein will be compromised.

Other features, aspects and embodiments of the method of manufacture described above will become apparent from the further specific description of the invention provided below.

In a further aspect of the invention, there is provided a sleeve assembly manufactured according to the method(s) prescribed above.

Thus the invention provides an entirely novel sleeve construction which is not only of significantly reduced weight as compared to the conventional solid cylindrical and tubular steel magnetic sleeves currently in use, but is also of entirely sufficient and more than adequate structural strength and dimensional stability to withstand the rigours of both machining and operative use, despite having been significantly weakened as a result of the extensive machining out of magnet-receiving slots. One of the primary innovative factors of the sleeve construction of the present invention is the manner in which the various component parts of the sleeve construction are assembled together, and the important relative differences in their physical and mechanical properties, all of which act in concert to lend what could potentially be a relatively flimsy structure with the required mechanical, structural strength and dimensional stability to enable such a lightweight sleeve construction to perform as required.

A specific embodiment of the invention is now described by way of example and with reference to the accompanying drawings wherein.

DETAILED DESCRIPTION

Figure 1:
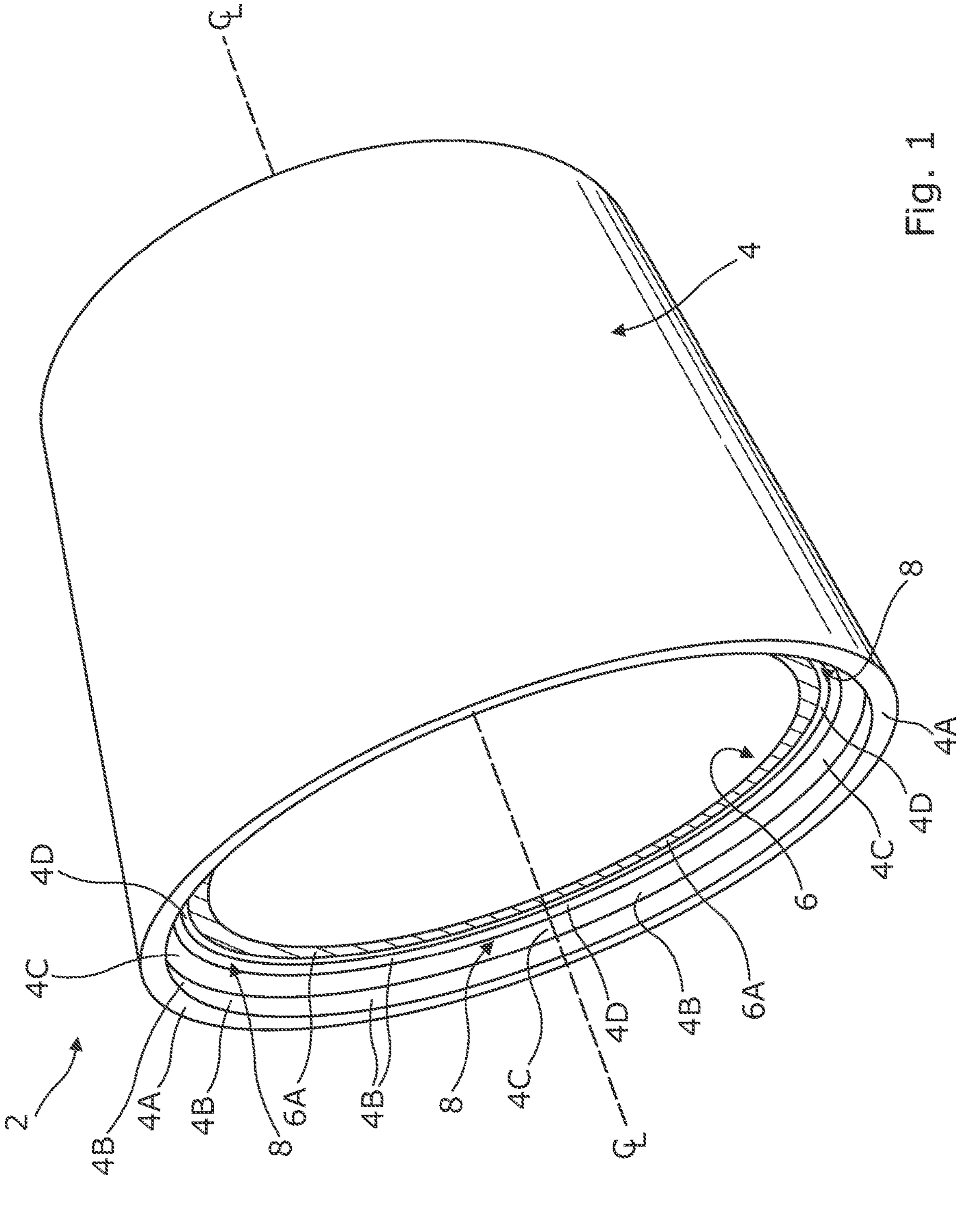
FIG. 1 shows a perspective view of a partially completed sleeve construction according to the present invention, comprising in particular a cylindrical tube with compressible liner bonded therein.

Referring firstly to FIG. 1, there is shown a sleeve assembly indicated generally 2 and illustrated in a partially completed state. As will be seen in the Figure, and as a result of the perspective view, only the near end is fully illustrated, but it is to be assumed by the skilled reader that the arrangement and configuration of the alternate (far) end of the sleeve assembly is identical in practically all respects, and that, in the condition illustrated in FIG. 1 at least, the sleeve assembly is completely symmetrical, i.e. longitudinally about its axial mid-point, and axially about any diametral section. In this specific description, almost exclusive reference is made to the tube being of a plastics material, specifically an engineering plastics material. However, the reader should understand that for some indeed many applications, it may be more preferable to manufacture the tube entirely and completely in Aluminium or another similarly lightweight, low density metal. Thus where "plastics" or similar or cognate expressions in the following specific description, the reader should understand that the term "Aluminium" could be used instead, and a sleeve assembly incorporating an Aluminium tube as opposed to one constituted of a plastics material is entirely within the scope of the present invention. Regardless of the particular lightweight material chosen, the advantages, benefits and effects of the invention still apply. Preferably, the material has a density of less than 3.5 g/cm3 at room temperature.

Specifically, sleeve assembly 2 consists essentially of a plastics material outer cylindrical tube 4 having and extending between annular end surfaces, one of which is referenced at 4A, and within which is bonded, for example by means of an epoxy- or other high-strength resinous adhesive, a cylindrical tubular compressible liner 6 which also has, and extends axially between, a pair of annular end surfaces, one of which is referenced at 6A. Ideally, the plastics material chosen for the tube is one which is both structurally and dimensionally stable and thus rigid, resilient, but not brittle, and one which can be machined with relative ease and without cracking, tearing or without experiencing extensive plastic deformation. Suitable plastics materials include, without limitation, Delrin®, Nylon 6, Nylon 6, 6 or other Polyoxymethylene (POM), acetal, polyacetal, and polyformaldehyde, polyamide, or polyester.

The geometric planes in which the annular end surfaces 4A, 6A lie are most preferably exactly orthogonal to the central longitudinal axis of the sleeve assembly as a whole, referenced "$C_L$" in this and other Figures. Importantly, and as can be seen in the Figure, the liner 6 is axially shorter than the tube 4 within which it is bonded so that, when the liner 6 is initially slid completely within the tube 4 prior to bonding and disposed substantially axially centrally and thus symmetrically therein, the annular end surfaces 6A of the liner are set back from those of the tube so that a pair of identical annular rebates (one of which is referenced at 8) is automatically created at either end of the sleeve assembly internally of the tube 4. Said rebates 8 are defined, on one hand, by those portions of the interior cylindrical surface 4B of the tube 4 which remain exposed and extend beyond the annular end surfaces 6A of the liner 6, and on the other hand by said liner annular end surfaces 6A.

In accordance with the invention (and as can be seen more clearly in FIG. 5), once the liner is firmly bonded to and within the interior cylindrical surface of the tube, and the adhesive has cured, the remaining exposed interior cylindrical surfaces of said tube are subjected to further machining, for example a grinding operation carried out around substantially the entire interior cylindrical surface of the tube so as to slightly (for example by an amount of between 1-5 mm, depending on the overall outer diameter of the sleeve assembly, and the annular thickness of the tube) enlarge the internal diameter in end regions thereof. As a result of this machining/grinding out operation, which is effected to an axial depth from the annular end surfaces of the tube which is either marginally less than, or about the same as that at which the annular end surfaces of the liner are disposed, annular shoulders, one of which is referenced at 4D, are created in the interior of the tube at both ends thereof. Said shoulders are important because they provide a surface against which end rings can abut and be tightened against, thus placing the sleeve assembly in a state of non-negligible axial compression between said end rings, and without engaging (at least significantly) with, and thus also axially compressing, the annular end surfaces of the liner. The specific configuration of end rings, the annular shoulders, and the respective annular end surfaces of both tube and liner will be explained further below.

In some embodiments of the invention, and depending on whether there exist remnants of cured adhesive at the interface between the annular end surfaces of the liner and the immediately adjacent cylindrical surface of the tube, it may be necessary or preferable to additionally machine, for example by grinding, the annular end surfaces of the liner, both to remove such adhesive remnants, and also to ensure that the annular end surfaces of the liner lie in a plane which is exactly orthogonal the central (datum) axis of the sleeve assembly as a whole. It is to be mentioned here that it is of course equally if not more important that the geometric plane in which the annular shoulders machined into the interior of the tube as mentioned above and described more fully below lie is also exactly orthogonal to the central (datum) axis of the sleeve assembly as a whole because any offset of the/those places from orthogonality would immediately compromise the axial compression which the end rings apply on the tube between them, with the result that the tube could be subjected instead to undesirable torsional and shear forces.

In further accordance with the invention, screw threads 4C are machined into the said interior cylindrical surfaces 4B, said threads being provided over at least some of the axial length of those interior cylindrical surfaces as illustrated, preferably between 25%-75% of the axial length thereof. Preferably, the pitch of the threads machined into this surface is at least 0.5 mm, more preferably at least 1 mm, and most preferably in the range 1-2.5 mm, this being on account of the fact that machining threads of very fine pitch (e.g. less than 0.5 mm, and commonly less than 1 mm) in plastics materials is exceedingly difficult if not impossible, at least with standard thread-machining equipment. Obviously the particular requirement for larger thread pitch does not apply for tube constituted of metal or alloys thereof, as such can generally be machined with much greater precision.

Once the threads 4C have been machined in the partially complete sleeve assembly of FIG. 1, it is ready to receive the end rings.

Figure 2:
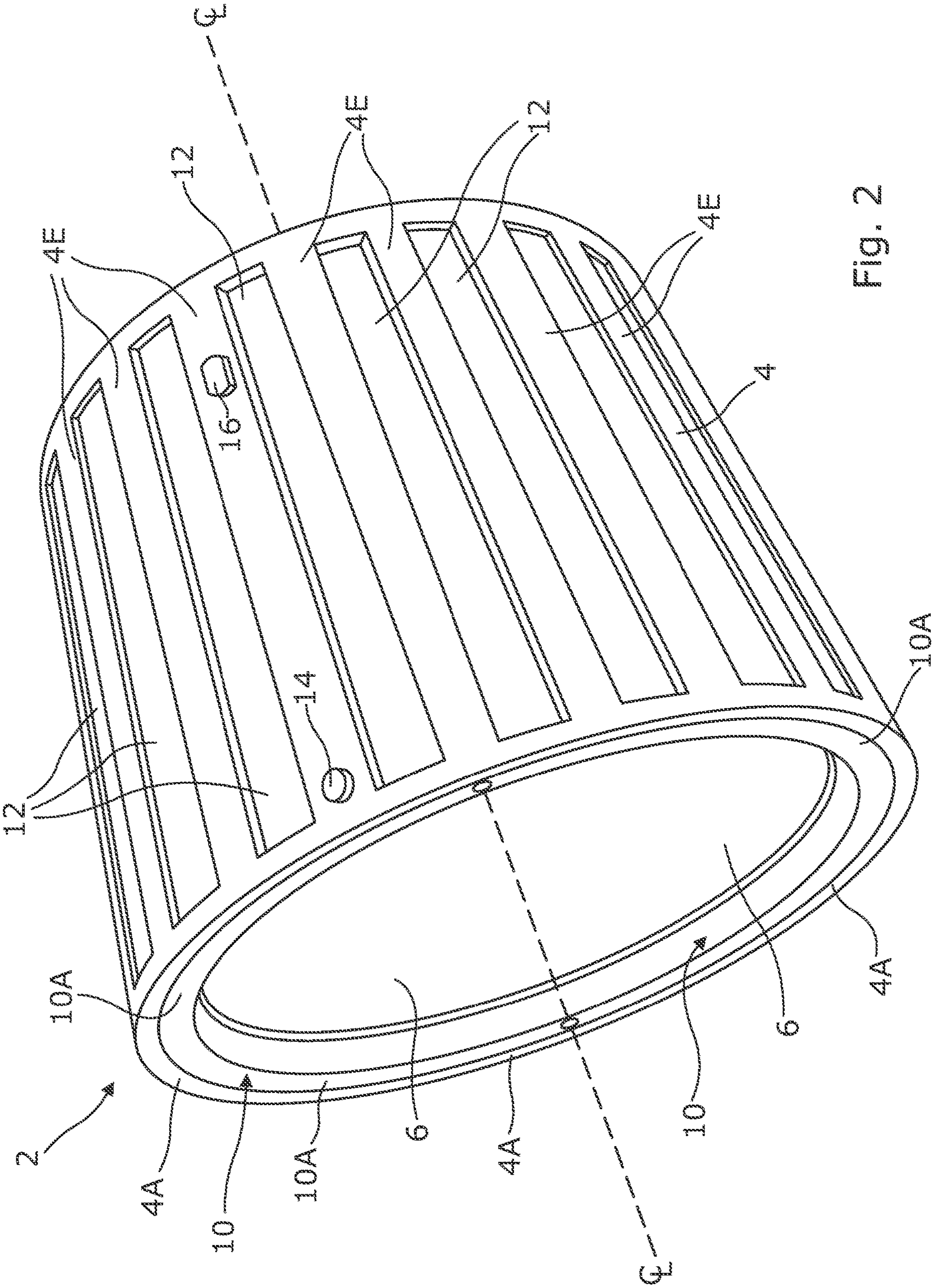
FIG. 2 shows a perspective view of the sleeve construction of FIG. 1 in a later stage of completion, wherein end rings have been fitted (one of which is visible in the Figure) and axially aligned, spaced-apart recesses have been machined out of the exterior cylindrical surface of the tube.
Figure 4:
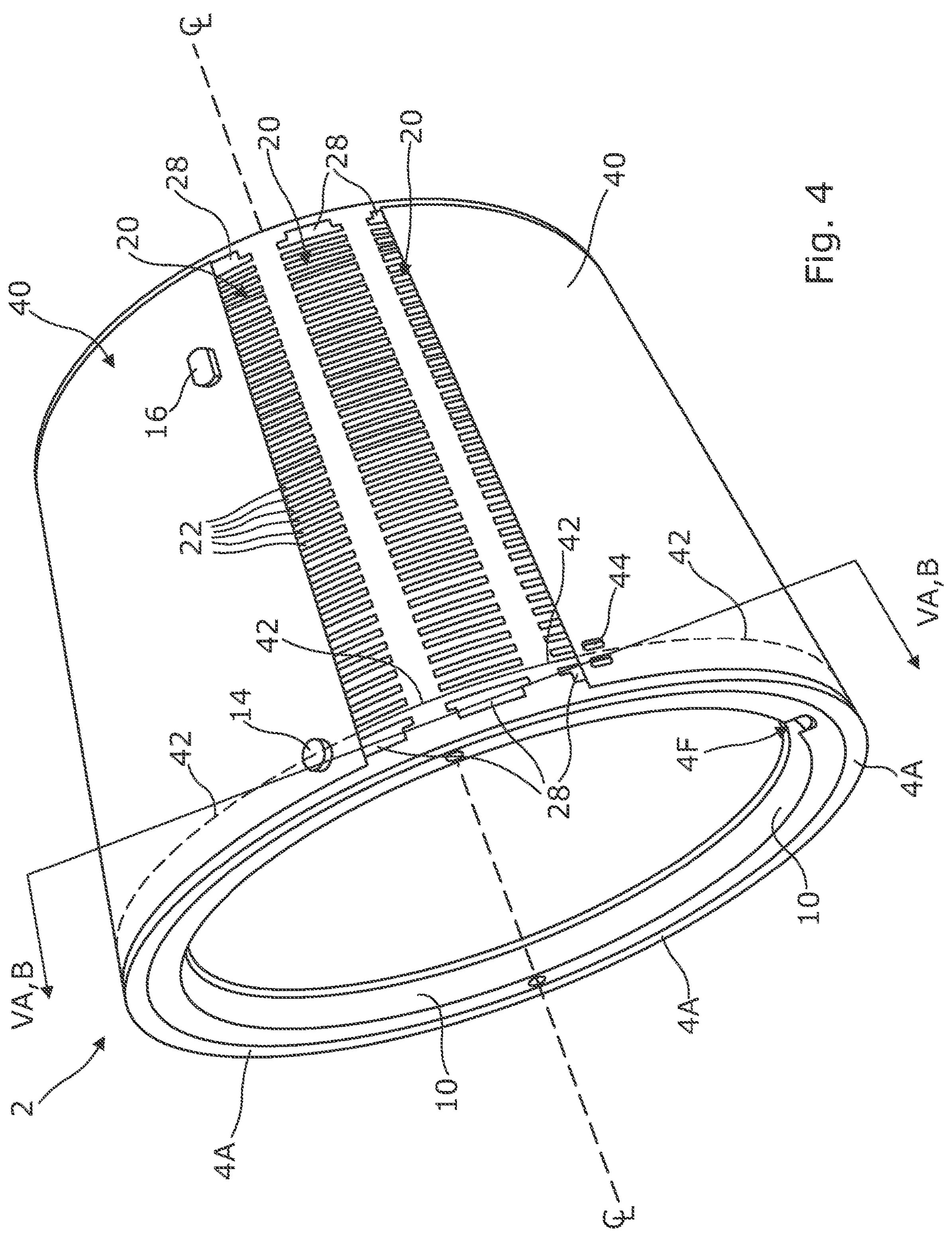
FIG. 4 shows a perspective view of a completed sleeve construction according to the present invention around which a printing or coating plate is firmly magnetically secured to the exterior cylindrical surface of the sleeve construction.

At this point, it is useful to provide exemplary dimensions for a conventional metal decorating sleeve assembly—the sleeve assembly illustrated in the Figures and in particular FIGS. 1, 2, and 4 may have overall axial length of 180 mm, effective/final outer diameter of 227 mm, and an inner diameter (i.e. the inner diameter of the liner) of 197 mm. The liner axial length may be of the order of 156 mm, thus defining internal rebates at either end of the liner at an axial depth of 12 mm. Further machining of these rebates outwardly by a radial amount of about 1.9 mm naturally produces annular shoulders having that radial dimension completely around the interior exposed cylindrical surface of the tube, at a 12 mm axial depth. The end rings themselves are thus 12 mm in axial depth, and have outer diameter (on which threads are machined) may have an effective outer diameter of 214 mm, and in some embodiments the end rings may be provided with an enlarged outer lip having a diameter of 215 mm which may be received in a corresponding seat surface of similar radial dimension (1 mm) milled into the end surface of the tube (not shown).

Referring now to FIG. 2, sleeve assembly 2 is illustrated in a more advanced state of completion. Specifically, steel end rings, one of which is generally referenced at 10, and being provided around their exterior cylindrical surfaces with threads corresponding to the threads 4C provided on the interior cylindrical surfaces of the tube 4 in the end regions thereof, are screwed into the rebates 8 of the sleeve assembly at both ends thereof. As will be understood by the skilled person, and can be seen in FIG. 2 (and in more detail in FIG. 5), the most preferable and required arrangement of the end rings after they have been completely and axially compressingly screwed in place within the sleeve assembly is that their outermost annular end surfaces 10A lie precisely, exactly flush with the immediately adjacent and respective annular end surfaces 4A of the tube, at both ends. In order to achieve this configuration, it is preferable that, initially, the axial depth of the end rings 10 is slightly (e.g. 0.5-1.5 mm) greater than the axial distance between the annular shoulders 4D and the annular end surfaces 4A of the tube. In this case, even after the end rings are firmly and compressingly screwed into the sleeve assembly, the annular end surfaces of the end rings will stand proud some amount, e.g. 0.4-1.4 mm, proud of the adjacent annular end surfaces of the tube. Therefore, most preferably, both the ends of the sleeve assembly are subjected to a yet further machining step which not only removes any proud-standing portion of the end rings, but also ensures that both adjacent respective annular end surfaces of the tube and end rings lie exactly flush with one another, in the same geometric plane, and (in some embodiments) an exact, predetermined/desired axial distance from one another thus providing a sleeve assembly having a precise overall axial length.

One further dimensional feature of the end rings deserves mention. It can be seen in the Figure (and also in more detail in FIG. 5) that the interior diameter of the end ring 10 is greater than the corresponding dimension of the liner 6 adjacent which each end ring 10 is ultimately disposed, and thus some small portion (e.g. 0.5-2 mm wide) of the annular end surface of the liner remains exposed, visible and not concealed behind the ring. As the skilled person will appreciate, this configuration is regarded as essential because in order for the sleeve assembly to be "blown" (by compressed air) onto an air mandrel, the compressible liner must be capable of being elastically radially expanded (and thus compressed) slightly before the liner, and thus the sleeve assembly as a whole can be slid onto and over the mandrel. Once the sleeve assembly is in the correct position, both axially and circumferentially, on the mandrel, the source of compressed air is released, and the liner then elastically relaxes into firm and secure engagement with the mandrel, and thus the sleeve assembly is firmly and securely mounted on the mandrel.

Turning now to the exterior cylindrical surface of the sleeve assembly illustrated in FIG. 2, it can be seen that a plurality of elongate recesses 12 being substantially rectangular in cross-section have been machined in or otherwise cut into the exterior cylindrical surface of the tube. Said recesses are substantially dimensionally identical and substantially evenly circumferentially spaced apart around the entirety of the exterior cylindrical surface of the tube, each being machined out to a particular uniform depth, typically of the order of 7-15 mm. As previously mentioned, the machining out of the recesses is conducted after the end rings 10 have been firmly secured in place at each end of the sleeve assembly so that its structural strength is thereby enhanced, particularly at the end regions thereof. In the configuration shown in the Figure, the recesses are most preferably substantially axially aligned with the central axis of the sleeve assembly, but it is possible, in some embodiments that the recesses may be machined in spiral fashion, i.e. such that there is some relative circumferential offset between the opposing terminal ends of each recess. It is also possible in some embodiments that the recesses may be axially open-ended, in that they do not have axially opposed terminal ends.

Figure 3A:
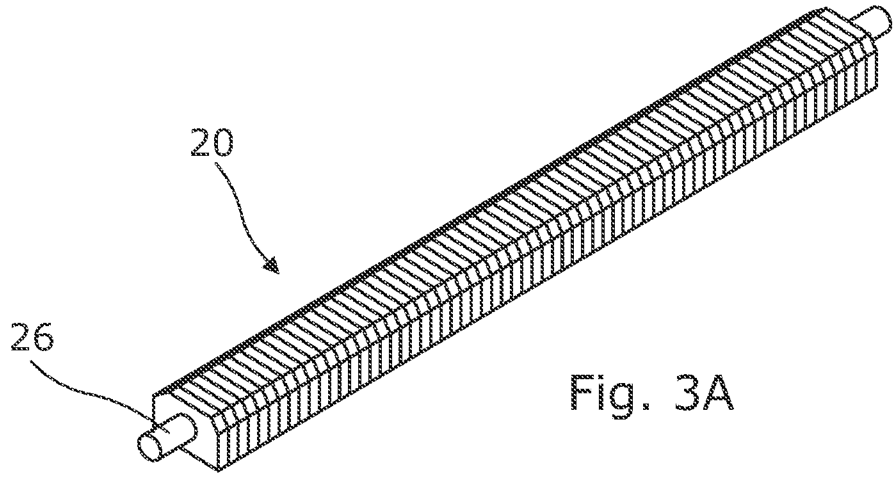
FIGS. 3A, 3B, 3C shows respectively a perspective view, an end elevation, and a plan view of an elongate magnet-and-keeper assembly of suitable axial length, width and depth dimensions to be relatively snugly received in any one of the recesses illustrated in FIG. 2.

However, the illustrated, axially aligned, terminated configuration of the recesses is preferred because straight-sided recesses can readily accept a pre-assembled similarly straight and appropriately dimensioned magnet assembly as illustrated in FIGS. 3A, B, C and described further below, and closed-ended recesses can much easier contain a fluent adhesive composition which may be spread or poured thereinto prior to insertion of a magnet-keeper assembly (see below). Regardless of the particular shape and orientation of the recesses, their depth and overall axial length are important because (a) generally speaking, the depth of the magnets and keepers, or of the magnet-keeper assembly, which each of the recesses receive is a significant factor in determining the overall magnetic field strength which they provide, and (b) the recesses must extend over substantially the entire axial length of the sleeve assembly to ensure that any ferromagnetic printing or coating plate which is to be magnetically mounted on and secured to the exterior cylindrical surface of the sleeve assembly is firmly magnetically held in place thereon over substantially the entirety of its width, which will, in most cases, be only slightly less than the overall axial length of the sleeve assembly itself.

For these reasons, not only do the recesses terminate axially very close (e.g. of the order of only a very few mm) to the annular end surfaces of the tube, but their depth is also comparatively a significant proportion of the overall annular thickness of said tube, for example being anything from 50-90% of that thickness. Thus without the structural reinforcement being provided by the already secured-in-place interior liner and encapsulating end rings, it would be generally impossible to machine out all the recesses to the required lengths, widths, and radial depths without structurally damaging or indeed destroying the tube.

As can be seen in the figure therefore, the machining out of the recesses in spaced apart relationship leaves lands 4E of the tube 4 between each recess. Of course, the substantially circumferentially even spacing of the recesses is the most preferred arrangement to avoid any unwanted rotational inertial imbalance, and therefore it is most desirable that the width of each of the lands 4E is substantially identical over the entire exterior cylindrical surface. It is also desirable that the axial separation distances between the terminal ends of each and every recess and the respective most proximate annular end surface of the tube are also identical so that the sleeve assembly as a whole is essentially perfectly inertially symmetric. This condition of rotational or inertial balance is an important consideration, because in use, inertial forces arising from the high speed (many 10 s if not hundreds of revolutions per second) can be significant, and for lightweight plastics sleeves become of significantly greater concern, at least as compared to the more conventional but significantly heavier metal sleeve assemblies.

Typical dimensions for the recesses (such as may be provided around the exterior surface of the particular sleeve assembly having the specific dimensions abovementioned) may be (for all recesses): axial length 172 mm, width 20 mm, depth 6 mm, and a total number of slots, 26, in 2 sets of 13 on respective diametrically opposite halves of the sleeve assembly, such being separated by the pair of plate locating formations (see further description below).

A final feature of the partially completed sleeve assembly of FIG. 2 are the raised, proud-standing plate locating formations 14, 16, which are screwed or adhered in place within appropriately dimensioned recesses (not referenced) drilled or otherwise machined in at least one of the lands 4E between a respective adjacent paid of recesses 12. Although not illustrated in or immediately apparent from the Figure, in most preferred embodiments, the recesses 12 are uniformly sized and spaced apart so that the exterior cylindrical surface of the sleeve assembly is substantially diametrically symmetrical. Thus, about any diametral section taken through the sleeve assembly, exactly the same number of whole (and possibly part-) recesses 12 (and of course also lands 4E) would exist in each sectional half. In such an arrangement, each recess 12 and land 4E would automatically have a corresponding diametrically opposite recess and land, and in most preferred arrangements, one further pair of plate locating formations may be provided in that land being diametrically opposite that in which plate locating formations 14, 16 are provided.

Figure 3B:
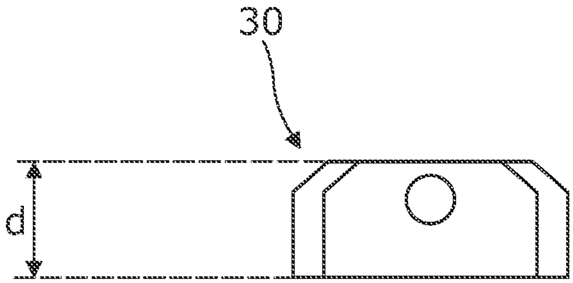
Figure 3C:
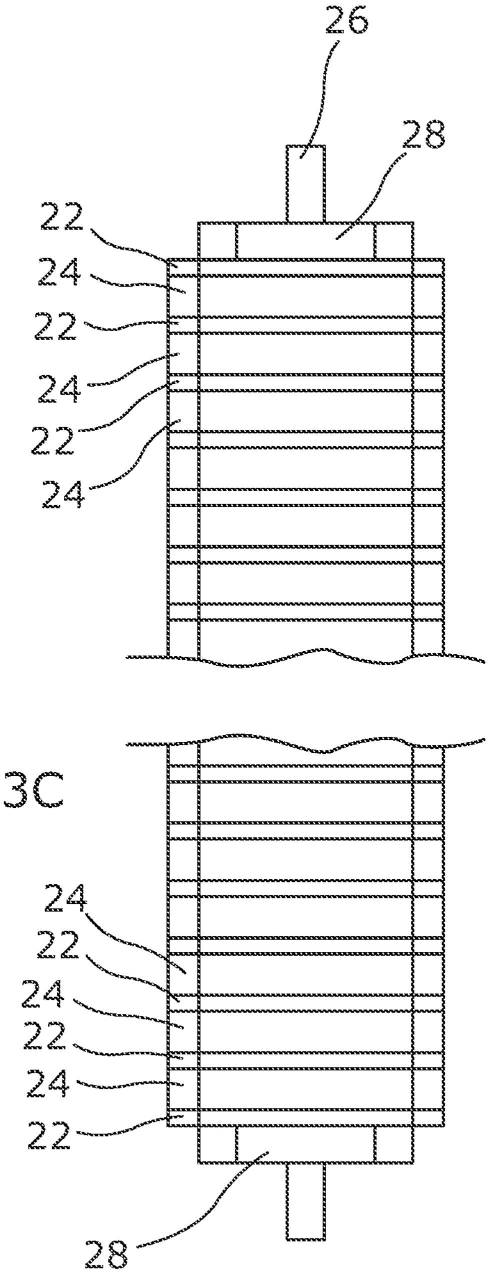

Referring now to FIGS. 3A, 3B, 3C, there is shown one possible magnet-and-keeper assembly 20 comprising an alternating series of steel or other ferromagnetic material keepers 22 and intervening typically sintered ferrite magnets 24, each being disposed on a central locating (steel) rod 26 and all being sandwiched and contained between a pair of (steel) containing end pieces 28 firmly secured to said rod 26. The cross-sectional shape 30 of each of the magnets and keepers is shown in FIG. 3B, and the overall length of the assembly, measured from the ends of rod 26, may initially be slightly greater than the axial length of each and every recess 12 into which the assembly is adapted to fit, as a result of the manner in which the magnet-and-keeper assemblies are manufactured and assembled. Therefore, prior to insertion thereof into any recess, the tips of the rod 26 may be cut or otherwise machined off to allow the remaining assembly to be snugly received within any recess. Prior to such insertion, the interior of any receiving recess 12 may be part-filled with an adhesive bonding compound, for example an epoxy resin, so that when the magnet assembly is inserted and pressed firmly therein, the bonding compound flows around the sides of the recess and into the various interstices which may exist between the magnet-and-keeper assembly and the recess itself. Most notably, the depth "d" (see FIG. 3B) of the magnet-and-keeper assembly will be generally the same as the depth of each and every recess so that the upper surfaces of the magnet-and-keeper assemblies ultimately lie approximately flush with the surfaces of the adjacent lands lying on either side of any particular recess. Naturally, each and every recess receives an identical magnet-and-keeper assembly in this manner, and thereafter the adhesive is allowed to cure so that each magnet-and-keeper assembly is robustly secured within each recess.

Of course, it is equally possible, although less efficient, to manually fill the recesses with an alternating sequence of individual magnets and keepers, as is currently conventionally done, particularly for spirally arranged recesses. The important considerations for both methods of construction are merely that the magnets and keepers are substantially of the same depth, that depth is broadly identical to the depth of the recess, and that the recess is substantially completely filled over its entire axial length with magnets and their respective keepers. Regardless of the manner in which the recesses 12 are filled with magnets and keepers, once all the recesses are so filled, the entire exterior cylindrical surface of the sleeve assembly is then subjected to precision surface grinding whereby the overall outer diameter (OD) of the sleeve assembly is slightly reduced (e.g. by 0.5-1.5 mm) down to required ultimate OD, a critical dimension for operative performance. Notably, this grinding step also removes any cured adhesive residue extant on the surface, and furthermore results in the arcuate smoothing of the exterior-facing surfaces of the magnets and their respective keepers so that not only do the edges of the magnets and keepers lie precisely flush with the adjacent plastics material lands and thus the interface regions therebetween are perfectly smooth and thus essentially continuous, but the entire exterior surface of the sleeve assembly is rendered perfectly cylindrical about the central axis.

It should be mentioned here that there is a further possible alternate arrangement for the recesses, namely that instead of being machined out or otherwise created in a generally linear, axial direction relative to the sleeve assembly as a whole, the recesses could of course be disposed circumferentially and axially adjacent each other along substantially the entire exterior cylindrical surface of the sleeve. Thus, in this alternative embodiment, the recesses would extend generally circularly around the sleeve exterior surface as opposed to the illustrated embodiment wherein the recesses extend generally axially linearly from one end of the sleeve to the other. Of course, a sleeve assembly with recesses arranged in this alternative way would still result in the exterior surface thereof being substantially magnetic once the recesses were occupied by suitable magnet-keeper assemblies, and thus capable of adequately securing a printing plate or other work component thereto. Also, aspects of the present invention which require that the end rings provide structural support in the region of, and possibly also directly underneath the recesses would still, at least to some extent, still apply in the alternate arrangement, because the two circular recesses most remote from one another and disposed at one or other end of the sleeve assembly would still of course be required to be provided very close to the ends of the sleeve assembly for exactly the same reasons as the linear recesses of the primary embodiment extend similarly very close to the ends of the sleeve assembly. Those two, but only those two recesses would still therefore require the structural support provided by the substantially more rigid end rings disposed immediately below them in the sleeve assembly.

Referring now to FIG. 4, there is shown a finally completed sleeve assembly 2 to and around which a ferromagnetic printing/coating plate 24 is wrapped and magnetically secured thereto. As can be seen, the length of plate 40 (a single plate in this instance) is slightly less than the circumferential dimension of the sleeve assembly, and the lateral (width) dimension of the plate is both slightly less than the axial dimension of the sleeve assembly and slightly greater than the axial length of the recesses 12 in each of which the magnet assemblies 20 have been adhered. As the plate length is less than the circumferential dimension of the sleeve assembly, 3 of the said magnet assemblies are exposed as seen in the Figure, the outline of the keepers 22 and end pieces 28 of which, being typically of steel or other ferromagnetic metal, can clearly be seen. In contrast, the magnets within the magnet assemblies are not clearly seen in the Figure, because typically being of a black sintered ferrite material and thus (in this particular embodiment at least) the magnets are essentially the same colour as the typically black plastics material of the tube 4 and therefore rendered somewhat invisible or not at all clearly distinguishable from said plastics material, particular after the exterior cylindrical surface is ground down to precise outer diameter. Specifically, this grinding process has the dual effect of somewhat polishing or rendering more distinct the steel elements of the magnet assemblies while simultaneously swaging or somewhat merging or blurring the edges of the magnets with the plastics material lying to either side thereof so the magnets thus become somewhat invisible within, or indistinguishable from, said plastics material.

In order that the plate 40 can be applied to and precisely mounted on and around the exterior cylindrical surface of the sleeve assembly, a pair of appropriately sized, shaped and dimensioned holes are punched though the plate, said holes being in precise alignment with the most proximate lateral edge of the plate, and spaced apart by exactly the same distance as that axial distance between the correspondingly shaped plate locating formations 14, 16. Thus, when the plate is to be mounted on the sleeve assembly, the plate is manoeuvred so that the punched holes therein are directly above the plate locating formations, and then the relevant edge of the plate is place in position so that the plate locating formations pass through the punched holes. Thereafter, the remaining length of the plate is wrapped around the exterior cylindrical surface of the sleeve assembly. The plate, being generally thinner than the distance by which plate locating formations 14, 16 stand proud of the exterior cylindrical surface of the sleeve assembly will therefore, as illustrated, lie beneath said plate locating formations, which thus also stand proud of the exterior surface of said plate. As a final means of ensuring that the plate 40 is precisely correctly positioned on the sleeve assembly, a scribe line 42 is created circumferentially completely around the exterior cylindrical surface of the sleeve assembly so that a scribe line registration formation 44 formed or otherwise provided on plate 40 can be aligned with the scribe line, and thus the plate can be axially and circumferentially precisely positioned on the sleeve.

One further final feature of the end rings, shown in FIG. 4, should also be mentioned. In particular, one (and usually only one) end ring is provided with a very precisely machined registration notch 4F, the dimensions and shape of which correspond exactly to a registration keyway or similar formation provided on the mandrel onto and over which the sleeve assembly is adapted to be mounted, thus ensuring that the sleeve is correctly circumferentially positioned on the mandrel. Furthermore, said registration notch is provided at a very precisely determined circumferential position on the sleeve assembly itself relative to the plate location formations 14, 16 so that the circumferential position of the plate 40 (or plates) relative to the underlying mandrel is also very precisely determined.

It is worth mentioning here that the end ring which is provided with the one or more registration notches 4F is generally always regarded as provided the "datum", i.e. it is that end ring from which all other relevant dimensions of the sleeve are determined, particularly axially.

Figure 5A:
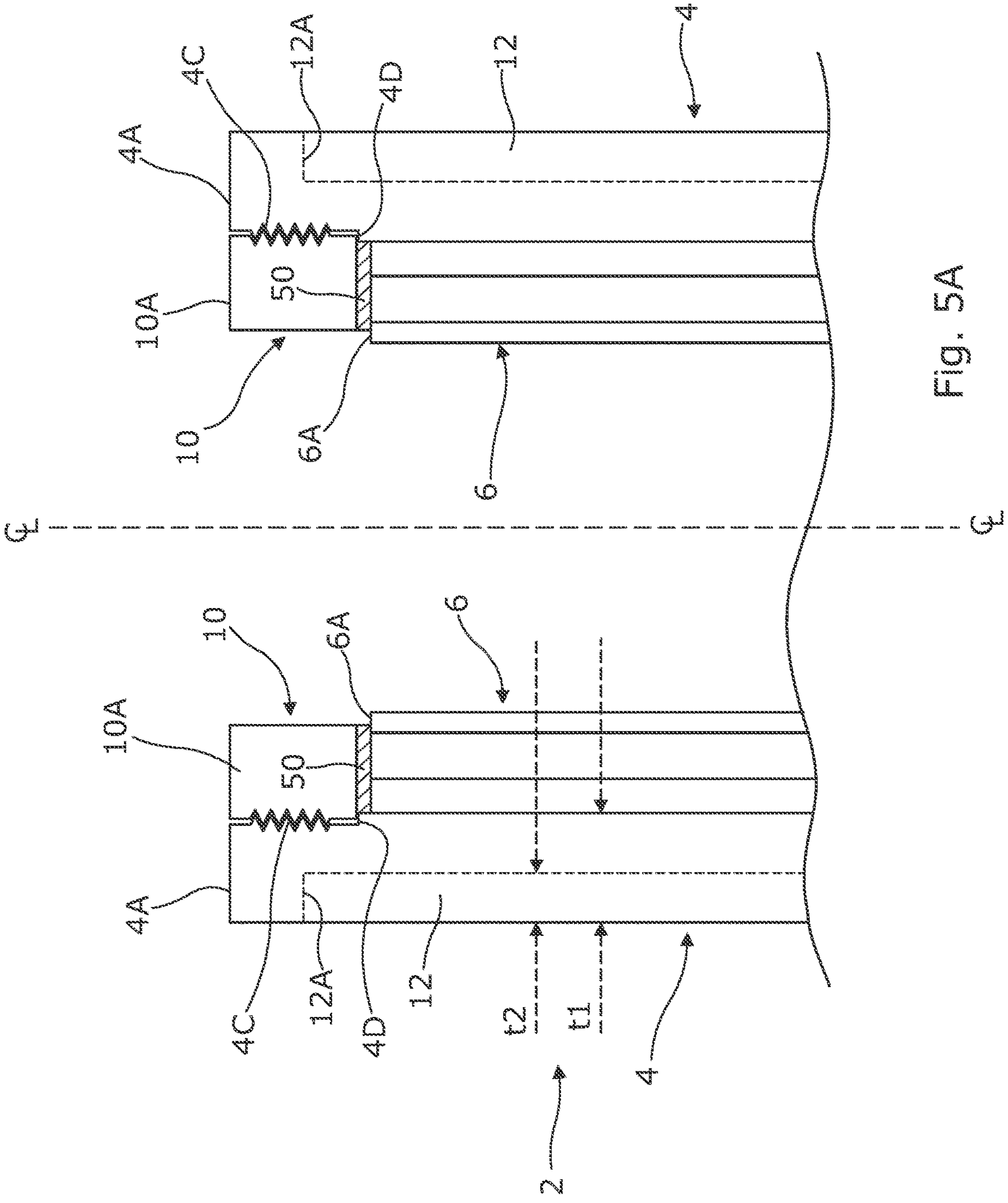
FIGS. 5A, 5B show respectively sectional elevations through the sleeve construction as indicated in FIG. 4 at V-A, B, said sectional elevations "A" and "B" respectively illustrating different possible embodiments of the invention, in particular as regards the relative axial relationship between the terminal ends of the recesses and the extent to which said recess are (or are not) undercut by the internal rebates provided internally of the sleeve construction at either end and in which the end rings are disposed.
Figure 5B:
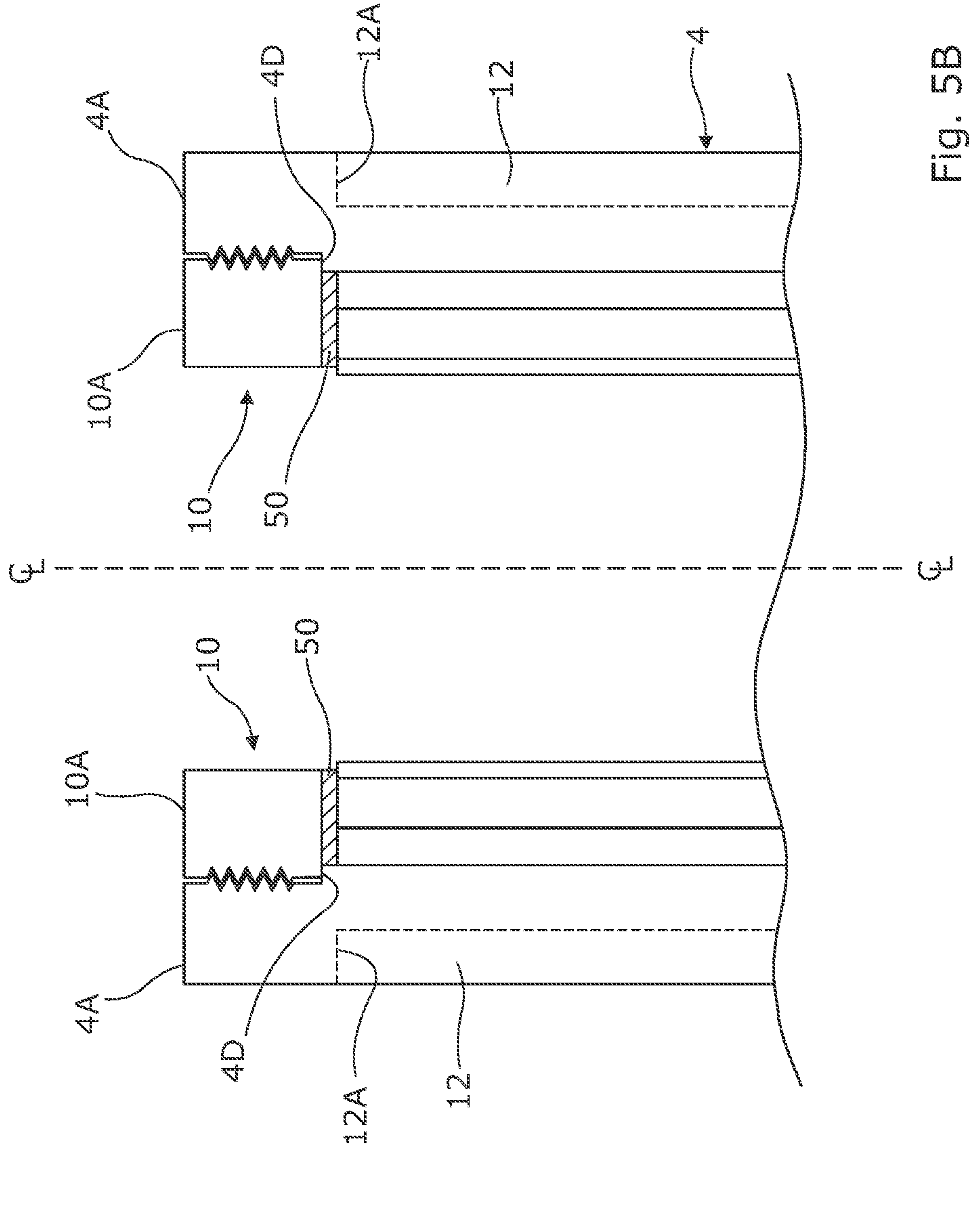

Referring to FIGS. 5A and 5B, it can be seen, firstly in FIG. 5A, that the recesses 12, terminal end walls of which are referenced at 12A, are machined to a depth ("$t_2$" in the Figure) which is a significant proportion (of the order of 40-50, and possibly up to 90%) of the overall annular thickness of the tube 4, referenced as "$t_1$" in the Figure. Furthermore, the axial locations of the end walls 12A of the recesses relative to the shoulders 4D provided within the interior of the tube 4 can be seen. In particular, in this embodiment, the axial depth at which the shoulders 4D are provided is such that the recesses 12 are undercut to some non-negligible extent. In some embodiments, the degree of axial separation, ie. The undercut distance, may typically be of the order of 5-15 mm. Thus from this Figure it can clearly be seen why the structurally much stronger steel end rings must be already secured in place when the machining of the recesses is performed in the comparatively much less structurally strong tube. As the skilled person will appreciate, the circular, continuous end rings provide a structurally strong, and thus highly elastically resistant reaction surface for the interior cylindrical surface of the tube in the end regions thereof, so much so in fact that the machine tool performing the machining out of the recesses at said end regions can successfully perform such machining without damaging or otherwise structurally compromising the tube, notwithstanding the fact that there is proportionally very little plastics material of the tube remaining between the base of the machining tool (i.e. the base of the recess) and the interior cylindrical surface of said tube, i.e. that region in which the interior threads are provided and into which the end ring is screwed.

From FIGS. 5A and 5B, the relative inner radial/diametral dimensions of the end ring 10 and the axially adjacent liner 6 should be noted. In particular, from the Figures it is clear that the liner (in its radially uncompressed condition) effectively protrudes radially inwardly of the end rings in its relaxed condition, and can thus be radially outwardly expanded until it becomes flush with the end ring 10.

Finally, as can again be seen from FIGS. 5A and 5B, the relative axial separation of the shoulders 4D from the annular end surface 6A of liner 6 should be noted. This axial separation gives rise to an annular interstice betwixt end ring 10 and said annular end surface 6A which (a) may be filled with a sealing gasket, O-ring or curable gasket/sealing composition 50, and (b) ensures that when the end rings are tightened against the shoulders 4D at both ends of the sleeve assembly, the respective annular end surfaces 6A of the liner are not also compressed, or even directly contacted by the end rings, as this can lead to undesirable rupturing or other deformation of the liner leading to a partial or complete compromise of the compressibility of the liner, especially at the end regions thereof. Finally, as regards to FIG. 5A, it can be seen that between the threads 4C and the corresponding threads (not referenced) provided on the end rings, there is provided an intervening sealing and/or adhesive composition, such as a curable epoxy resin, which effectively both seals the threaded region rendering it fluid-impermeable, and also simultaneously ensures an exceedingly secure connection between the end ring 10 and the tube 4 to the extent that the end ring effectively becomes inseparable therefrom, and (most importantly) cannot circumferentially rotate relative thereto. By such means therefore, the circumferential position of end ring relative to the tube to and within which it is screwingly connected is effectively permanently set once the adhesive/sealing composition cures.

Referring specifically now to FIG. 5B, a slightly modified configuration is depicted in which the terminal end walls 12A of the recesses 12 are disposed axially more distant from the annular end surfaces 4A, 10A of the tube and end ring respectively than the shoulders 4D. Even in this configuration, however, the end rings still play an important structurally supporting role, because as the machine tool which performs the machining out of the recesses approaches the end of its travel and thus the creates the terminal end walls 12A of the recesses, the action of said machine tool on the plastics material will nevertheless give rise to a bending moment in the vicinity of the end region, which of course the structurally much stronger end ring component can much better resist that the comparably structurally much weaker plastics material.

Thus, the present invention should be considered as covering both the above arrangements, and in particular any arrangement where the terminal ends walls of the recesses 12A are axially proximate the internal shoulders 4D, for example being within 1-5 mm of one another, measured on the longitudinal axis of the sleeve assembly.

It should also be mentioned here that although much of the foregoing description of the present invention has been couched in terms of the resistance that structurally much stronger, e.g. steel, end rings provides for the sleeve assembly as a whole, in terms of its being able to withstand the rigours of machining and machine tools working directly on and in the plastics material, it is of course possible that the tube 4 may be cast, formed, extruded, or otherwise created with the recesses already in place, i.e. created as a result of the casting or other forming process. In this case, there would of course be no requirement for the recesses to be separately machined. Despite this, however, there will generally always be the requirement that exterior cylindrical surface of the sleeve assembly be machined, for example by surface grinding, which itself can entail significant circumferential and radial forces which will inevitably be of most concern at the end regions of the sleeve assembly where, were it not for the existence of the structurally much stronger end rings and the robust manner in which they are secured within the sleeve assembly, the plastics material would be bound to fail.

The invention claimed is:

1. A sleeve assembly (2) comprising a cylindrical tube (4), formed from one of: an engineering plastics material, a metal or an alloy thereof, having a density less than 3.5 g/cm$^3$ and having exterior and interior cylindrical surfaces extending generally between a pair of annular end surfaces (4A), said tube having machined or otherwise provided therein a plurality of recesses (12) substantially completely occupied by comparatively rigid magnetic means (20) which are firmly secured therein, said recesses being of substantially uniform depth along their length, and being uniformly spaced apart circumferentially of the tube and extending axially from one end of the tube to another end of the tube over substantially the entire axial length of the tube, wherein said sleeve assembly further comprises a tubular radially compressible liner (6) which is shorter in axial length than the cylindrical tube and which is bonded inside said tube to the interior cylindrical surface thereof axially centrally thereof thus leaving interior cylindrical end regions (4B) of the tube exposed beyond the annular end surfaces (6A) of said liner, said interior cylindrical end regions having rebates (8) extending radially outwardly from the circular interface between said liner and said tube so as to define annular shoulders (4D) within the interior of the tube at either end thereof, said interior cylindrical end regions being provided with screw threads (4C) so as to be capable of receiving a pair of correspondingly threaded end rings (10) constituted of a material having a modulus of elasticity which is at least twice that of the material of which the cylindrical tube is constituted, and having an inner diameter which is greater than the inner diameter of the compressible liner thus allowing the interior cylindrical surface of said liner to be radially expanded towards a position in which the interior cylindrical surface lies substantially flush with an inner cylindrical surface of said end rings, and wherein said annular shoulders (4D) are provided internally of the tube at a relatively shallower axial depth from the respective annular end surfaces (4A) of said tube than the axial distance between the terminal end of at least one of the recesses (12) and the annular end surfaces of the tube most proximate thereto, the arrangement being that when said end rings are screwed fully into said rebates and into abutting relationship with the annular shoulders and tightened thereagainst, not only do said end rings exert axial compression on the cylindrical tube, but said end rings also provide underlying structural support for the end regions of the sleeve assembly underneath said at least one recess.

2. The sleeve assembly (2) according to claim 1, wherein the annular shoulders (4D) are provided internally of the tube at a relatively shallower axial depth from the respective annular end surfaces (4A) of said tube than the axial distance between the terminal ends of all the recesses (12) and the annular end surfaces of the tube most proximate thereto.

3. The sleeve assembly (2) according to claim 2, wherein the annular shoulders (4D) provided at either end of the tube lie substantially flush with the annular end surfaces of said liner (6).

4. The sleeve assembly (2) according to claim 1, wherein the annular shoulders (4D) provided at either end of the tube lie substantially flush with the annular end surfaces of said liner (6).

5. The sleeve assembly (2) according to claim 1, wherein the modulus of elasticity of the end rings (10) is one of: at least a factor of 2 greater; at least a factor of 3-5; and at least one order of magnitude greater than the material of which the cylindrical tube (4) is constituted.

6. The sleeve assembly (2) according to claim 1, wherein the cylindrical tube (4) is constituted entirely of Aluminium and the end rings are constituted entirely of steel.

7. The sleeve assembly (2) according to claim 1, wherein the cylindrical tube (4) is constituted of an engineering plastics material, being a synthetic polymer which is both non-fibrous and not fibre-reinforced, said synthetic polymer being one of, or some combination of: an acetal-based homopolymer or copolymer, a polyamide, and a polyester, and the end rings (10) are constituted entirely of steel.

8. The sleeve assembly (2) according to claim 1, wherein the exterior cylindrical surface of the liner (6) is securely and firmly bonded to the interior cylindrical surface of the tube by means of a high strength epoxy-based adhesive which, once cured, provides an effective and rigid bridge between the adjacently disposed cylindrical surfaces of said liner and said tube respectively, over substantially the entirety of those surfaces.

9. The sleeve assembly (2) according to claim 1, wherein axially outermost annular end surfaces (10A) of the end rings (10) lie substantially flush with the annular end surfaces (4A) of the cylindrical tube (4).

10. The sleeve assembly according (2) to claim 1, wherein the recesses (12) provided in the exterior cylindrical surface of the cylindrical tube (4) are axially aligned with the longitudinal axis of the sleeve assembly as a whole, with each recess containing an generally elongate arrangement of multiple magnet-keeper pairs (22, 24) which, as a unit, substantially fill and are adhered within said recesses, the uppermost surfaces of all said magnet-keeper pairs lying substantially flush with lands (4E) defined between each adjacent pair of recesses and thus disposed circumferentially to one or other side thereof.

11. The sleeve assembly (2) according to claim 1, wherein the end rings (10), in addition to being screwingly fitting into the ends of cylindrical tube (4), are adhered in place by means of a suitable curable adhesive composition, applied between one or both of threaded and unthreaded surfaces (4B, 4C) of the cylindrical tube (4) ends, and corresponding threaded and unthreaded surfaces of said end rings.

12. The sleeve assembly (2) according to claim 1, wherein at least one of the pair of end rings (10) is provided with one or more of: one or more registration notches (4F); and a radially extending visible indicator.

13. The sleeve assembly (2) according to claim 12, wherein the exterior cylindrical surface of the cylindrical tube (4) is provided with at least one pair of plate positioning formations (14, 16), each of said pair of formations being provided within a land (4E) defined between a pair of adjacent recesses (12), and both of said formations being both axially aligned with the longitudinal axis of the sleeve assembly and accurately circumferentially located with respect to a registration notch (4F) provided in the end ring (10).

14. A method of manufacturing a sleeve assembly (2), the method comprising the following steps, performed on a cylindrical tube (4) formed from one of: an engineering plastics material, a metal or an alloy thereof, having a density less than 3.5 g/cm$^3$ and having outer and inner diameter dimensions respectively greater than and less than an ultimately required outer diameter/inner diameter dimensions of the finished sleeve assembly, counterboring the tube to a precise inner diameter dimension, adhesively bonding a tubular compressible liner (6) having an outer diameter of the order of 0.2-1.5 mm less than the inner diameter of the tube, and being of comparable length, within said tube to create a combined sleeve assembly, cutting at least one length from the combined sleeve assembly, said length being of the order of 0.5-4 mm longer than an ultimately required axial length of the sleeve assembly, machining out rebates (8) at either end of the sleeve assembly, said rebates having an axial depth of at least 8 mm back from annular end surfaces (4A) of the tube (4), said machining comprising complete removal of liner over said axial depth as well as some amount of a tube interior, said amount being between 4-25% of an annular thickness of the tube such that annular shoulders (4D), lying substantially flush with adjacent annular end surfaces of the liner (6), are defined within the sleeve assembly at both ends thereof, machining threads on exposed internal cylindrical surfaces (4C) of said rebates (8);

screwing end rings (10) into each sleeve assembly end and tightening said end rings against the annular shoulders (4D) such that the tube is axially compressed between said end rings to a predetermined degree, said end rings being of an axial depth which is marginally greater than the axial depth of the rebates, machining a plurality of magnet-receiving recesses (12) in the exterior cylindrical surface of the sleeve assembly (2), said recesses being of a depth greater than between 50%-90% annular thickness of the annular end surfaces of the tube and extending substantially axially from one end of the sleeve assembly to the other, and furthermore being generally evenly spaced circumferentially around said exterior surface, such that a remaining surface area of the tube is less than 50% of an original cylindrical exterior surface area, said recesses terminating, at both ends, in a location which is axially more distant from the most proximate annular end surface of the tube than that at which said annular shoulders are disposed, adhering within every one of said recesses a plurality of magnet and magnet keeper pairs (22, 24) so as to completely fill said recesses, machining the exterior cylindrical surface of the sleeve assembly, with magnet assemblies adhered in place therein, such that the outer diameter of the sleeve assembly is precisely determined relative to a datum axis of machining, and machining the annular end surfaces of the sleeve assembly at both ends, including said end rings, such that any portions of said end rings which stand axially proud of the adjacent annular end surfaces of the tube are removed, and such that the sleeve assembly is machined down to a precise, predetermined axial length.

15. The method according to claim 14, further comprising the step, prior to screwingly inserting an end ring (10) into one or other end of the sleeve assembly (2), of applying an adhesive compound over one or more of:

the surfaces of the annular shoulders (4B) of the rebates (8), the exposed annular end surface (6A) of the liner (6) inside the sleeve assembly, some or all of the unthreaded interior cylindrical surface (4B) of the rebate (8) provided in the tube at the said one or other end of the sleeve assembly, some or all of interior threaded regions (4C) provided on said rebate, and some or all of exterior threaded regions of the end ring (10).

16. The method according to claim 15, further comprising the steps of:

machining out at least one circumferential registration notch (4F) of predetermined circumferential width and axial depth dimensions in an annular end surface (4A) of at least one of the end rings (10), whereby said notch can receive a correspondingly shaped and dimensioned registration formation provided on a mandrel assembly on which said sleeve assembly (2) is to be mounted, machining out at least one pair of recesses adapted to receive a pair of accurately machined plate-locating formations (14, 16), said recesses being arranged in axially perfect alignment with the central axis of the sleeve assembly and at a precise angular position relative to the angular position of the registration notch, and thereafter inserting said pair of plate-locating formations into said recesses, and accurately positioning and securing said formations therein.

17. The method according to claim 16, wherein two pairs of recesses is machined out from the exterior cylindrical surface of sleeve assembly (2), the second pair of recesses also being adapted to receive said plate-locating formations (14, 16) and being firstly disposed in perfect axial alignment with the central axis of the sleeve assembly and secondly disposed in precisely diametrically opposed relationship to the first pair of recesses.

18. The method according to claim 14, further comprising the steps of:

machining out at least one circumferential registration notch (4F) of predetermined circumferential width and axial depth dimensions in an annular end surface (10A) of at least one of the end rings (10), whereby said notch can receive a correspondingly shaped and dimensioned registration formation provided on a mandrel assembly on which said sleeve assembly (2) is to be mounted, machining out at least one pair of recesses adapted to receive a pair of accurately machined plate-locating formations (14, 16), said recesses being arranged in axially perfect alignment with the central axis of the sleeve assembly and at a precise angular position relative to the angular position of the registration notch, and thereafter inserting said pair of plate-locating formations into said recesses, and accurately positioning and securing said formations therein.

19. The method according to claim 18, wherein two pairs of recesses is machined out from the exterior cylindrical surface of sleeve assembly (2), the second pair of recesses also being adapted to receive said plate-locating formations (14, 16) and being firstly disposed in perfect axial alignment with the central axis of the sleeve assembly and secondly disposed in precisely diametrically opposed relationship to the first pair of recesses.

* * * * *